United States Patent
Lee et al.

(10) Patent No.: US 12,321,183 B2
(45) Date of Patent: Jun. 3, 2025

(54) THERMAL CONTROL DEVICE AND METHODS UTILIZING TEMPERATURE DISTRIBUTION MODELING

(71) Applicant: Cepheid, Sunnyvale, CA (US)

(72) Inventors: Marissa Lee, Sunnyvale, CA (US);
Jessica Koay, Sunnyvale, CA (US);
Charles Rohrs, Sunnyvale, CA (US);
Earl Solis, Sunnyvale, CA (US);
Matthew Piccini, Sunnyvale, CA (US);
Richard J. Casler, Jr., Sunnyvale, CA (US)

(73) Assignee: Cepheid, Sunnyvale, CA (US)

( * ) Notice: Subject to any disclaimer, the term of this patent is extended or adjusted under 35 U.S.C. 154(b) by 422 days.

(21) Appl. No.: 17/574,951

(22) Filed: Jan. 13, 2022

(65) Prior Publication Data
US 2022/0253079 A1 Aug. 11, 2022

Related U.S. Application Data

(60) Provisional application No. 63/136,968, filed on Jan. 13, 2021.

(51) Int. Cl.
*G05D 23/19* (2006.01)
*B01L 1/02* (2006.01)
(Continued)

(52) U.S. Cl.
CPC .......... *G05D 23/1931* (2013.01); *B01L 1/025* (2013.01); *B01L 7/52* (2013.01);
(Continued)

(58) Field of Classification Search
CPC ....... G05D 23/1931; B01L 1/025; B01L 7/52; B01L 2300/0663; B01L 2300/0681;
(Continued)

(56) References Cited

U.S. PATENT DOCUMENTS

2003/0121905 A1 7/2003 Nanno et al.
2015/0238968 A1 8/2015 Termaat et al.
(Continued)

FOREIGN PATENT DOCUMENTS

WO 2019178121 A1 9/2019

OTHER PUBLICATIONS

Communication pursuant to Rules 161(1) and 162 EPC for European Patent Application No. 227730520 dated Mar. 27, 2024.
(Continued)

*Primary Examiner* — Steve S Tanenbaum
(74) *Attorney, Agent, or Firm* — Potomac Law Group, PLLC; Reza Mollaaghababa; Ido Rabinovitch

(57) ABSTRACT

Thermal control devices and methods to provide improved control, speed and efficiency in temperature cycling are provided herein. Such thermal control device and methods can include one or more active elements, such a thermoelectric cooler device, that is controlled by an algorithm that regulates a temperature distribution of an adjacent reaction-vessel according to a temperature distribution command trajectory and estimated reaction-vessel temperature distribution. Some embodiments include two active elements that are bilaterally applied to opposing sides of the reaction-vessel. In some embodiments, the estimated reaction-vessel temperature is determined based on a state of power electronics of the element and a temperature output of one or more sensors of a portion of the element and/or an ambient environment of the reaction-vessel. Methods of calibration of such systems utilizing a thermal calibrator as a proxy for the reaction-vessel are also provided herein.

22 Claims, 18 Drawing Sheets

(51) Int. Cl.
  *B01L 7/00*      (2006.01)
  *F25B 21/02*     (2006.01)
  *G01K 1/02*      (2021.01)
  *G01K 13/024*    (2021.01)
  *G01N 1/42*      (2006.01)
  *G01N 1/44*      (2006.01)

(52) U.S. Cl.
  CPC .............. *F25B 21/02* (2013.01); *G01K 1/026* (2013.01); *G01K 13/024* (2021.01); *G01N 1/42* (2013.01); *G01N 1/44* (2013.01); *B01L 2300/0663* (2013.01); *B01L 2300/0681* (2013.01); *B01L 2300/1822* (2013.01); *B01L 2300/1894* (2013.01)

(58) Field of Classification Search
  CPC ...... B01L 2300/1822; B01L 2300/1894; F25B 21/02; G01K 1/026; G01K 13/024; G01N 1/42; G01N 1/44
  USPC .......................................................... 62/3.6
  See application file for complete search history.

(56) References Cited

U.S. PATENT DOCUMENTS

2017/0023281 A1* 1/2017 Fromm .................... B01L 7/52
2018/0195776 A1  7/2018 Hayes et al.

OTHER PUBLICATIONS

Xianbo Qiu et al., "Temperature Control for PCR Thermocyclers Based on Peltier-Effect Thermoelectric," 2005 IEEE Engineering in Medicine and Biology 27th Annual Conference, Shanghai, China, 2005, pp. 7509-7512, doi: 10.1109/IEMBS.2005.1616249.
Communication pursuant Article 94(3) EPC, for corresponding European Application No. 227730520, dated Jun. 5, 2024.
International Search Report and Written Opinion for International Application No. PCT/US2022/012275 dated Jul. 11, 2022.

* cited by examiner

Differential-mode
$V_{TEC-static} = -V_{TEC-pivot}$

Superposition-mode

Problem statement – pole presentation

THERMAL CONTROL DEVICE AND METHODS UTILIZING TEMPERATURE DISTRIBUTION MODELING

CROSS-REFERENCES TO RELATED APPLICATIONS

This application is a Non-Provisional of and claims the benefit of priority of U.S. Provisional Application No. 63/136,968 filed on Jan. 13, 2021, the entire contents of which are incorporated herein by reference.

STATEMENT AS TO RIGHTS TO INVENTIONS MADE UNDER FEDERALLY SPONSORED RESEARCH AND DEVELOPMENT

This invention was made with U.S. Government support under Agreement No. W15QKN-16-9-1002 awarded by the ACC-NJ to the MCDC. The Government has certain rights in the invention.

BACKGROUND OF THE INVENTION

The present invention relates generally to thermal control devices, more particularly to a device, system and methods for controlling temperature, particularly thermal cycling in a nucleic acid analysis.

This application is generally related to: U.S. Pat. No. 10,544,966 entitled "Thermal Control Device and Methods of Use" issued on Jan. 28, 2020; U.S. patent application Ser. No. 13/843,739 entitled "Honeycomb tube," filed on Mar. 15, 2013; U.S. Pat. No. 8,048,386 entitled "Fluid Processing and Control," filed Feb. 25, 2002; and U.S. Pat. No. 6,374,684 entitled "Fluid Control and Processing System," filed Aug. 25, 2000; each of which is incorporated herein by reference in its entirety for all purposes.

Various biological testing procedures require thermal cycling to facilitate a chemical reaction via heat exchange. One example of such a procedure is polymerase chain reaction (PCR) for DNA amplification. Further examples include, rapid-PCR, ligase chain reaction (LCR), self-sustained sequence replication, enzyme kinetic studies, homogeneous ligand binding assays, and complex biochemical mechanistic studies that require complex temperature changes.

Such procedures require a system that can accurately raise and lower sample temperatures rapidly and with precision. Conventional systems typically use cooling devices (e.g., fans) that occupy a large amount of physical space and require significant power to provide a required amount of performance (i.e., a rapid temperature drop). Fan-based cooling systems have issues with start-up lag time and shutdown overlap, that is, they will function after being shut off and thus do not operate with rapid digital-like precision. For example, a centrifugal fan will not instantly blow at full volumetric capability when turned on and will also continue to rotate just after power is shut off, thus implementing overlap time that must be accounted for in testing. Such lag and overlap issues frequently become worse with device age.

The fan-based cooling systems have typically provided for systems with low cost, relatively acceptable performance and easy implementation, thus providing the industry with little incentive to resolve these issues. The answer thus far has been to incorporate more powerful fans with greater volumetric output rates, which also increase space and power requirements. One price of this is a negative effect on portability of field testing systems, which can be used, for example, to rapidly detect viral/bacterial outbreaks in outlying areas. Another problem is that this approach is less successful in higher temperature environments, such as may be found in tropical regions. Accordingly, there is an unmet need to address the deficiencies of known heating/cooling devices used in biological testing systems.

Thermal cycling is typically a fundamental aspect of most nucleic acid amplification processes, where the temperature of the fluid sample is cycled between a lower annealing temperature (e.g. 60 degrees) and a higher denaturation temperature (e.g. 95 degrees) as many as fifty times. This thermal cycling is typically carried out using a large thermal mass (e.g. an aluminum block) to heat the fluid sample and fans to cool the fluid sample. Because of the large thermal mass of the aluminum block, heating and cooling rates are limited to about 1° C./sec, so that a fifty-cycle PCR process may require two or more hours to complete. In tropical climates, with elevated ambient temperatures the cooling rates can be adversely affected thus extending the time for thermal cycling from, for example, 2 hours to 6 hours.

Some commercial instruments provide heating rates on the order of 5° C./second, with cooling rates being significantly less. With these relatively slow heating and cooling rates, it has been observed that some processes, such as PCR, may become inefficient and ineffective. For example, reactions may occur at the intermediate temperatures, creating unwanted and interfering DNA products, such as "primer-dimers" or anomalous amplicons, as well as consuming reagents necessary for the intended PCR reaction. Other processes, such as ligand binding, or other biochemical reactions, when performed in non-uniform temperature environments, similarly suffer from side reactions and products that are potentially deleterious to the analytical method.

For some applications of PCR and other chemical detection methodologies, the sample fluid volume being tested can have a significant impact on the thermal cycling.

Optimization of the nucleic acid amplification process and similar biochemical reaction processes typically require rapid heating and cooling rates such that the desired optimal reaction temperatures can be reached as quickly as possible. This can be particularly challenging when performing thermal cycling in high-temperature environments such as found in tropical climates where facilities may often lack climate control. Such conditions may result in longer thermal cycling times with less specific results including undesired side reactions, for instance. Further, current approaches of controlling temperature of reaction chambers utilizing conventional temperature-controlled active elements fail to accurately control temperature of the fluid sample within the reaction-vessel (i.e. reaction-tube) and achieve optimal temperatures during thermal cycling, particularly when ambient temperatures are outside a standard range. Therefore, there is an unmet need for thermal control devices with greater heating and cooling rates that are not dependent on the ambient environment and can be produced at low cost and minimal size for inclusion in diagnostic devices. There is further need for thermal control devices that better control temperature cycling within a reaction chamber within the required scope of speed, accuracy, and precision of current generation systems.

BRIEF SUMMARY OF THE INVENTION

The present invention relates to a thermal control device that performs temperature control, particularly thermal cycling of a biological reaction-vessel with improved control, rapidity and efficiency. More specifically, the invention operates within the context of a dynamical system for which the control system is architected to achieve both observability and controllability. Here, observability shall be defined in a control-theoretic context and taken to mean a measure of how well internal states of a system can be inferred from knowledge of its external outputs. In a system with noisy measurements, a state-estimator is used to infer the internal state of the dynamical system. Controllability shall be defined in a control-theoretic context as the ability of a control input to move the internal state of a system from any initial state to any other final state in a finite time interval.

In one aspect, the invention pertains to a thermal control system for temperature control of a reaction-vessel, the reaction-vessel having two opposing major faces and that contains a sample to be analyzed. In some embodiments, the system includes at least one active element that generates a heat-flux, wherein the at least one active element is positioned to direct the heat-flux into the reaction-vessel face when placed adjacent thereto; and an electronics module having power electronics that power the at least one active element. The thermal control system includes one or more temperature sensors that are positioned and configured to measure the ambient temperature indicative of the thermal operating environment around the reaction-vessel and/or the temperature of a portion of the at least one active element. The system further includes a control unit having a processor. The controller is communicatively coupled with the one or more temperature sensors and operably coupled with the electronics module of the least one active element. The processor can be further configured to: determine an estimated reaction-vessel temperature distribution using at least one of a state of the power electronics of the electronics module and a temperature output from the one or more sensors as inputs; determine or obtain a temperature command or function; regulate a reaction-vessel temperature distribution in accordance with the temperature command or function and the estimated reaction-vessel temperature distribution so as to achieve a regulated output of the distribution that is substantially independent of the ambient temperature. Typically, the temperature command or function is a temperature distribution command trajectory, although in some embodiments the command could include one or more temperature constants. As used herein, "estimated reaction-vessel temperature" is used to mean applying state estimation to determine the temperature distribution in the presence of noisy measurements. Typically, the state of the power electronics includes at least one of an active element drive voltage, a current and a temperature-dependent electrical impedance. Here, trajectory shall be taken to mean a function of time. Temperature distribution shall be taken to mean a function that captures at least one of a mean temperature, a gradient of temperature and higher-order derivatives of temperature. A temperature distribution command trajectory will be taken to mean a vector function of time that captures the desired temperature distribution that the controller feedback and feedforward functions are designed to follow.

In some embodiments, the control unit further includes the vector of coefficients employed in a state-estimator recorded on a memory of the processor and configured for determining the reaction-vessel temperature distribution. The control unit can further include a control algorithm recorded on a memory of the processor and configured for regulating the reaction-vessel temperature distribution by utilizing a pole-zero filter model. In some embodiments, the one or more sensors include a first temperature sensor positioned and configured to measure the temperature of a portion of the at least one active element. The one or more sensors can further include a second temperature sensor positioned and configured to measure the ambient temperature indicative of the thermal operating environment around the reaction-vessel. Here, the determining of the distribution shall be taken in an information-theoretic context. A state-estimator will apply filtering to determine the distribution in the presence of noise in the sensor information. In some embodiments, the filters are optimized to minimize the error in a least-squares context. In some embodiments, penalty functions other than the quadratic used in a least-squares will be used in the filter optimization. Here, the term filter can mean the coefficients in a difference equation, a differential equation or a frequency-based, transfer function.

In some embodiments, thermal control system includes at least one active element, such as a thermo-electric cooler (TEC) that includes an array of Peltier elements sandwiched in between thermally-conductive plates. In some embodiments, the thermal control device uses more than one active element, for example, two active elements, such as two TECs that are positioned to be bilaterally applied to the reaction-vessel when placed within the temperature control system such that each TEC contacts an opposing face of the reaction-vessel. Each of the TECs can include a heat sink on the side opposing the reaction-vessel. The one or more temperature sensors can include a first temperature sensor mounted on each of the thermally-conductive plates of the TECs facing the reaction-vessel, typically on a porch of the TEC. The one or more sensors can further include a second temperature sensor applied in the air flow of at least one of the TEC heat sinks to measure the ambient environment. In some embodiments, the control unit is configured such that the estimated reaction-vessel temperature distribution includes at least one of an average sample temperature and a sample temperature gradient or profile across the two faces of the reaction-vessel.

In another aspect, the control unit can further be configured to operate according to differing modes. In some embodiments, the control unit is configured with a common-mode in which the reaction-vessel temperature is controlled by applying a common feedback control applied to each of the TECs to regulate the average sample temperature. The control unit can further include a temperature regulator control algorithm that applies feedforward control in accordance with a rate of change of the temperature distribution command trajectory and a difference between the temperature distribution command trajectory and the ambient temperature.

In some embodiments, the control unit of the thermal control system includes a state estimator that employs a common-mode state estimate that includes: a static estimation processing block that determines an average sample temperature as a linear function of the ambient temperature and an average of the two TEC temperature sensors; and a filter including at least one of a zero and at least one of a pole applied to the output of the static estimator. In some embodiments, the number of poles and the number of zeros is two and two respectively.

In another aspect, the control unit can be configured with a differential-mode having a differential feedback control to regulate the sample temperature gradient. The control unit can be further configured to apply feedforward control in accordance with a rate of change of the temperature distribution command trajectory and a difference between the temperature distribution command trajectory and the ambient temperature. In some embodiments, the control unit employs a differential-mode controller that uses the difference between the temperature estimates of opposing faces of the reaction-vessel, the estimate on each side determined by at least one temperature sensor and the state of the power electronics of a respective TEC. The control unit is further configured for superposition of the common-mode and differential-mode to achieve a desired temperature distribution. The control unit can be further configured to calibrate the temperature control system utilizing calibration data that is stored on a memory of the processor. In another aspect, the controller can superimpose the above-described common-mode and differential-mode controls to follow a reaction-vessel temperature distribution trajectory.

In some embodiments, the controller can be configured such that operation of the one or more active elements provide heating and cooling for thermal cycling that is controlled at a ramp rate of about 10° C. per second. Non-limiting exemplary ramp rates that can be achieved with the instant invention include 20, 19, 18, 17, 16, 15, 14, 13, 12, 11, 10, 9, 8, 7, 6, 5, 4, 3, 2, or 1° C. per second. In some embodiments, the controller facilitates thermal cycling between an elevated temperature and a reduced temperature. The elevated target temperature can be about 90° C. or greater and the reduced target temperature can be about 40° C. or less. In some embodiments, the reduced target temperature is in the range of about 40° C. to about 75° C. In some embodiments, the reduced target temperature is about 45, 50, 55, 60, 65, or about 70° C. In some embodiments, the temperature control system is configured to thermally cycle an adjacent reaction-vessel between a first temperature (e.g. an amplification temperature between 60-70° C.) and a second higher temperature (e.g. a denaturation temperature of about 95° C.), cycling between these temperatures as rapidly as possible.

In some embodiments, the thermal control device further includes a heat sink coupled with the reference face of the second thermoelectric cooler to prevent thermal runaway during cycling. The thermal control device may be constructed in a generally planar configuration and dimensioned to correspond to a planar portion of a reaction-vessel in a sample analysis device. In some embodiments, the planar size has a length of about 45 mm or less and a width of about 20 mm or less, or a length of about 40 mm by about 12.5 mm, such as about 11 mm by 13 mm, so as to be suitable for use with a reaction-vessel in a PCR analysis device. The generally planar configuration can be configured and dimensioned to have a thickness from an active face of a first thermoelectric cooler to an opposite facing side of the heat sink of about 20 mm or less. Advantageously, in some embodiments, the thermal control device can be adapted to engage with a reaction-vessel for thermal cycling of the reaction-vessel on a single side thereof to allow optical detection of a target analyte from an opposing side of the reaction-vessel during thermal cycling. In some embodiments, two thermal control devices are used to heat opposing planar sides of a reaction-vessel. In some embodiments, where two thermal control devices are used on opposite sides of the reaction-vessel (e.g. two-sided heating), optical detection is carried out by transmitting and receiving optical energy through the minor walls of the reaction-vessel, thus allowing for simultaneous heating and optical interrogation of the reaction-vessel.

In another aspect, the invention pertains to calibration system and methods for the thermal control system described herein. In some embodiments, the calibration system can include: an environmental chamber that operates the temperature control system in an ambient temperature within at least the nominal range for which the system is specified; and a thermal calibrator that serves as a proxy for a reaction-vessel temperature distribution measurement. The calibration system can further include: a processor in communication with the temperature control system under testing, the environmental chamber and the thermal calibrator. The processor can be further configured to: apply system identification that determines static estimate coefficients and a set of time-constants of the poles and zeros that minimizes a cost function representing a difference between a thermal distribution state estimate and that measured by the thermal calibrator over the calibration test run.

Methods of controlling a temperature of a reaction-vessel by a thermal control device are provided herein. As described above, the reaction-vessel has opposing major faces and the thermal control device has at least one active element adjacent to one major face of the reaction-vessel. In some embodiments, the thermal control device includes more than one active element, for example, two TECs applied bilaterally on opposite sides of the reaction-vessel. Such methods can include steps of: obtaining, with a control unit of the thermal control device, a temperature output from one or more temperature sensors of the temperature control system, the temperature output corresponding to a temperature of a portion of the active element(s) and/or an ambient temperature indicative of the thermal operating environment around the reaction-vessel; determining an estimated reaction-vessel temperature distribution using at least the state of the power electronics of the active element(s) and the temperature output; determining or obtaining a temperature command or function; and operating the active element(s) so as to regulate a reaction-vessel temperature distribution in accordance with the temperature distribution command trajectory and the estimated reaction-vessel temperature distribution so as to achieve a regulated output of the distribution that is substantially independent of the ambient temperature. Typically, the temperature command or function is a temperature distribution command trajectory. Typically, the state of the power electronics includes one or both of a drive voltage and a current. The one or more sensors can include a first temperature sensor positioned and configured to measure the temperature of a portion of the active element (s). The one or more sensors can further include a second temperature sensor positioned and configured to measure the ambient temperature indicative of the thermal operating environment around the reaction-vessel. The methods can further entail any of the additional aspects described herein, which may be incorporated into firmware into a control unit of the thermal control device.

In some embodiments, the thermal control device includes at least one active element where each active element is a thermo-electric cooler (TEC) including an array of Peltier elements sandwiched in between thermally-conductive plates. In some embodiments, the thermal control device includes more than one active element, for example two TECs that are positioned to be bilaterally applied to the reaction-vessel when placed within the temperature control system such that each TEC contacts an opposing face of the reaction-vessel.

In some embodiments, determining an estimated reaction-vessel temperature distribution includes determining at least one of an average sample temperature and a sample temperature gradient or profile across the two faces of the reaction-vessel. In some methods, operating the active elements entails operating two TECS in a common-mode in which the reaction-vessel temperature is controlled by applying a common feedback control from both TECs to regulate the average sample temperature. Such methods can further include applying feedforward control in accordance with at least one of a rate of change of the temperature distribution command trajectory and a difference between the temperature distribution command trajectory and the ambient temperature. In these, the state-estimator can be split into a static and dynamic part. Here, a static estimate of the mean reaction-vessel temperature is determined in time as a linear function of the instantaneous ambient temperature and an average of the two instantaneous TEC temperature sensors. The dynamic part passes the time-varying static estimate into a pole-zero filter to determine the reaction-vessel temperature. In some embodiments, the number of poles and the number of zeros of the pole-zero filter is two and two respectively.

In some embodiments, the methods include operating the two TECs according to a differential-mode having a differential feedback control to regulate the sample temperature gradient. The methods can include applying feedforward control in accordance with a rate of change of the temperature distribution command trajectory and a difference between the temperature distribution command trajectory and the ambient temperature. Operating in the differential-mode can include utilizing the difference of the temperature estimates of opposing major faces of the reaction-vessel, the estimate on each side determined by at least one temperature sensors and the state of the power electronics of a respective TEC. In some embodiments, the methods can include operating the TECs in a superposition mode that includes aspects of the common-mode and differential-mode to achieve a desired temperature distribution.

Methods of calibrating a temperature control system for thermal cycling of a reaction-vessel are also provided herein. Such calibration methods can include: operating the temperature control system within an environmental chamber having an ambient temperature within at least the nominal range for which the system is specified while a thermal calibrator that serves as a proxy for a reaction-vessel temperature distribution measurement is disposed within the chamber; and determining a set of static estimate coefficients and a set of time-constants of the poles and zeros that minimizes a cost function representing a difference between a thermal distribution state estimate and that measured by the thermal calibrator over a calibration test run.

DETAILED DESCRIPTION OF THE INVENTION

Figure 1A:
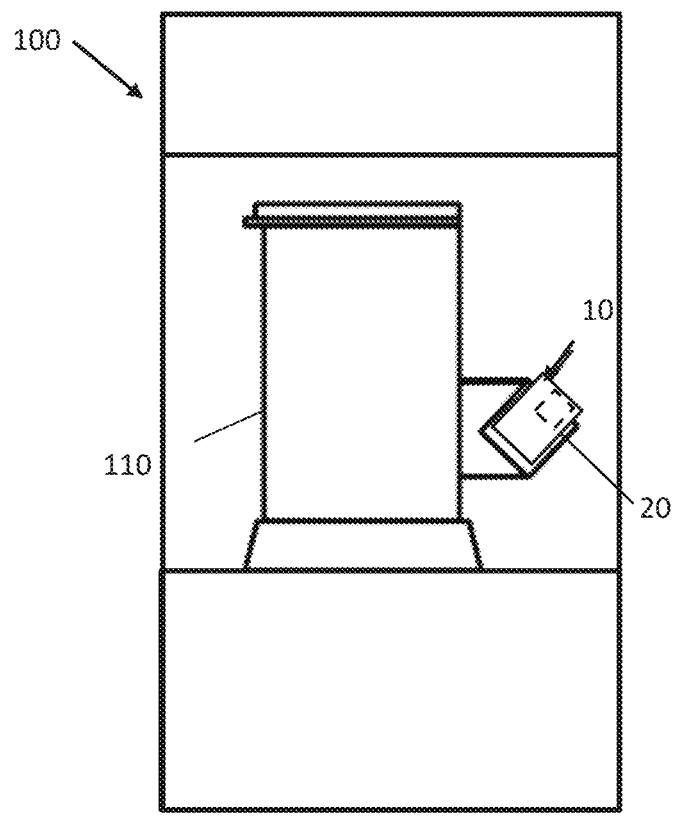
FIGS. 1A-1B provide an overview of a sample analysis system that includes a sample cartridge having a reaction-vessel and a thermal control device configured as a removable module adapted for interfacing with the reaction-vessel in accordance with some embodiments of the invention.

The present invention relates generally to systems, devices and methods for controlling thermal cycles in a chemical reaction, in particular, a thermal control device module adapted for use in controlling thermal cycling in a nucleic acid amplification reaction.

In one aspect, the invention provides a thermal control device that provides improved control and efficiency in thermal cycling, particularly thermal cycling for a polymerase chain reaction of a fluid sample in a reaction-vessel. Such devices can include one or more active elements (e.g. a TEC), each positioned in direct contact with or immediately adjacent the reaction-vessel so that a temperature of the active face of the TEC(s) can be used to control a temperature of the fluid sample within the reaction-vessel. Prior art approaches typically rely on the temperature of the TEC as corresponding to the temperature of the fluid sample and assume sufficient time for thermal conduction to equilibrate the temperature of the fluid sample within the reaction-vessel. In practice however, this assumption is not always accurate for rapid thermal cycling, particularly when ambient temperatures are outside of a standard operating range (e.g., high or low). By utilizing improved control approaches that operate the one or more active elements according to a control algorithm that utilizes an estimated model of temperature distribution across the reaction-vessel and the output from one or more temperature sensors, the temperature of the reaction-vessel during thermal cycling can be controlled more accurately and more quickly. Such improved thermal control devices and control methods can replace existing thermal control devices and control systems, thereby providing improved control, speed and efficiency when performing a thermal cycling procedure.

In another aspect, thermal modeling of a temperature distribution of the reaction-vessel can be implemented within a controller of the thermal device without directly measuring the temperature of the reaction-vessel. The thermal model can be determined based, at least in part, on the temperature outputs of one or more sensors that measure the temperature of a portion of the active element(s) (e.g. an active face) and/or a temperature of the ambient environment in which the reaction-vessel resides and an estimated temperature distribution. In some embodiments, this estimate can be determined partly based on a calibration. In some embodiments, these control methods utilize a pole-zero optimization for thermal modeling and control of the temperature distribution across the reaction-vessel. This approach allows for faster and more efficient thermal cycling than is possible with conventional thermal cycling procedures.

I. Exemplary System Overview

A. Biological Sample Analysis Device

In some embodiments, the invention relates to a thermal control device adapted for use with a reaction-vessel in a sample analysis device and configured to control thermal cycling in the reaction-vessel for conducting a nucleic acid amplification reaction. In some embodiments, the thermal control device is configured as a removable module that couples with and/or maintains contact with the reaction-vessel so as to allow thermal cycling as needed for a particular analysis, for example to allow amplification of a target analyte in a fluid sample disposed within the reaction-vessel. In some embodiments, the thermal control device has a planar configuration and is sized and dimensioned to correspond to a planar portion of the reaction-vessel of which thermal cycling is desired. In some embodiments, the thermal control device includes a coupling portion or mechanism by which the thermal control device is maintained in contact with and/or close proximity to at least one side of the reaction-vessel thereby facilitating the heating and cooling of a fluid sample contained therein. In other embodiments, the thermal control device is secured by a fixture or other means in a suitable position for controlling thermal cycling within the reaction-vessel. For example, the thermal control device may be affixed within a sample analysis device in which a disposable sample cartridge is placed such that when the sample cartridge is in position for conducting testing for a target analyte, the thermal control device is in a suitable position for controlling thermal cycling therein.

In some embodiments, the thermal control device is configured as a removable module that can be coupled with a reaction-vessel extending from a sample analysis cartridge configured for detection of a nucleic acid target in a nucleic acid amplification test (NAAT), e.g., Polymerase Chain Reaction (PCR) assay. Preparation of a fluid sample in such a cartridge generally involves a series of processing steps, which can include chemical, electrical, mechanical, thermal, optical or acoustical processing steps according to a specific protocol. Such steps can be used to perform various sample preparation functions, such as cell capture, cell lysis, purification, binding of analyte, and/or binding of unwanted material. Such a sample processing cartridge can include one or more chambers suited to perform the sample preparation steps. A sample cartridge suitable for use with the invention is shown and described in U.S. Pat. No. 6,374,684, entitled "Fluid Control and Processing System" filed Aug. 25, 2000, and U.S. Pat. No. 8,048,386, entitled "Fluid Processing and Control," filed Feb. 25, 2002, the entire contents of which are incorporated herein by reference in their entirety for all purposes.

In one aspect, the thermal control device is configured for use with a disposable assay cartridge having a reaction-vessel. In some embodiments, the thermal control device is configured for use with a non-instrumented disposable assembly that facilitates complex fluidic management and processing tasks. This disposable assembly having a reaction-vessel enables a complex, yet coordinated effort of mixing, lysing, and multiplexed delivery of reagents and samples to a final detection destination, an onboard chamber in a reaction-vessel. Inside this reaction-vessel is where intricate biochemical processes are carried out, such that it is critical to maintain accurate environmental conditions for the reaction to be successful and efficient. It is particularly important to PCR and rtPCR reactions to cycle temperatures rapidly and accurately, and doing so without a physical sensor at the reaction site proves challenging if not impossible. Current approaches use temperature offsets (calibrations) from temperature sensors located nearby to estimate what the temperature inside the reaction chamber will be. There are considerable drawbacks with this approach. Even with a small physical separation between temperature sensors and the reaction-vessel, offsets are determined at steady state, and most reactions never reach a true steady state due to the physical dynamics of the thermal system coupled with rapid temperature cycling times of the reactions. Even if a temperature sensor is engaged against the reaction-vessel, it still may not indicate the temperature distribution across the entire reaction-vessel or of the fluid sample disposed within the reaction-vessel. As such the temperature within the reaction-vessel is never truly known. To address this challenge, current approaches typically optimize thermal cycling to find "ideal" reaction temperatures and thermal setpoint hold times by successively iterating thermal conditions until success is met. This process is tedious and since the assay designers never truly know what the actual reaction chamber temperature is during the assay, optimized assay performance may never be realized. This process often results in setpoint hold times that are longer than necessary to ensure the temperature of the fluid sample reaches the desired temperature.

Thermal modeling is a different approach and can be implemented within analysis systems by use of the improved thermal control devices described herein. Thermal modeling of the temperature distribution across the reaction-vessel allows for accurate and precise real-time estimation of in situ reaction chamber temperatures. In addition, thermal modeling also enables the elucidation of dynamics which can be used to better control for speed (e.g. cycling times) and set the foundation for a more powerful system for future assay development. More importantly, these models can be validated and tuned to accurately reflect the real-world temperature as if the reaction chamber were actually instrumented with a physical sensor. Finally, thermal modeling can account for variations in ambient temperature, which is of vital importance in point-of-care system deployments, where high or low ambient temperatures impact reaction chamber temperatures that are otherwise unaccounted for. Thus, assay designers can be assured that temperatures inside the reaction chamber will always be precisely controlled to desired levels.

Figure 1B:
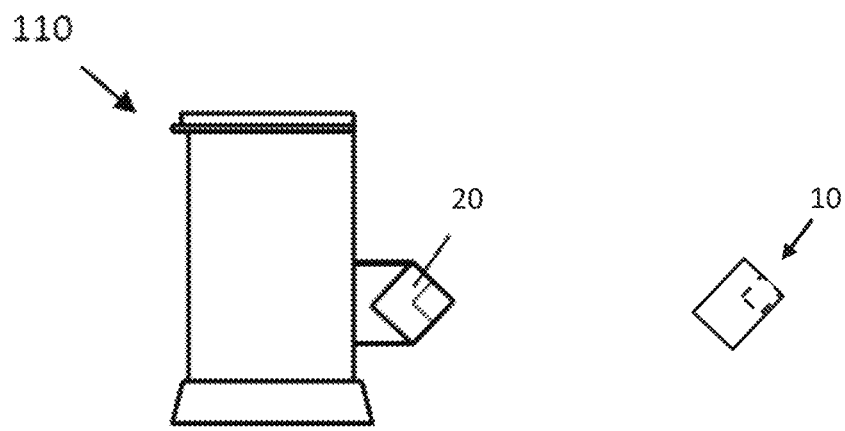

FIG. 1A shows an exemplary sample analysis device 100 for testing of a target analyte in a fluid sample prepared within a disposable sample cartridge 110 received within the device 100. The cartridge includes a reaction-vessel 20 through which the prepared fluid sample flows for amplification, excitation and optical detection during a PCR analysis for a target analyte. In some embodiments, the reaction-vessel can include multiple individual reaction wells and/or additional chambers, such as a pre-amplification chamber as shown in FIG. 1D. In some embodiments, the reaction-vessel contains only a single reaction well. The system further includes a temperature control system or device 10 disposed adjacent the reaction-vessel 20 for controlling thermal cycling of the fluid sample therein during the analysis. FIG. 1B illustrates the thermal control device 10 as a removable module, which allows the thermal control device 10 to be used on other sample cartridges in subsequent analyses. The thermal control device 10 may be configured to interface with electrical contacts within the sample analysis device 100 so as to power the thermal control device during thermal cycling.

Figure 1C:
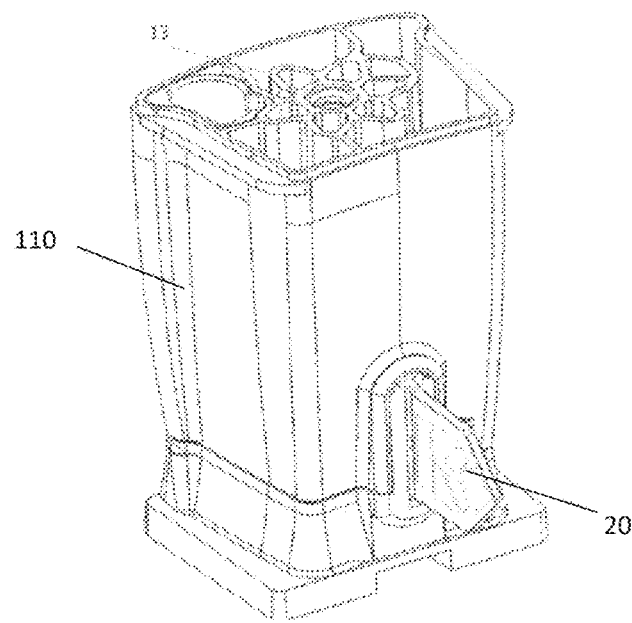
FIG. 1C-1D show a multi-chambered sample cartridge having a reaction-vessel and a planar reaction-vessel suitable for use with some embodiments of the invention.
Figure 1D:
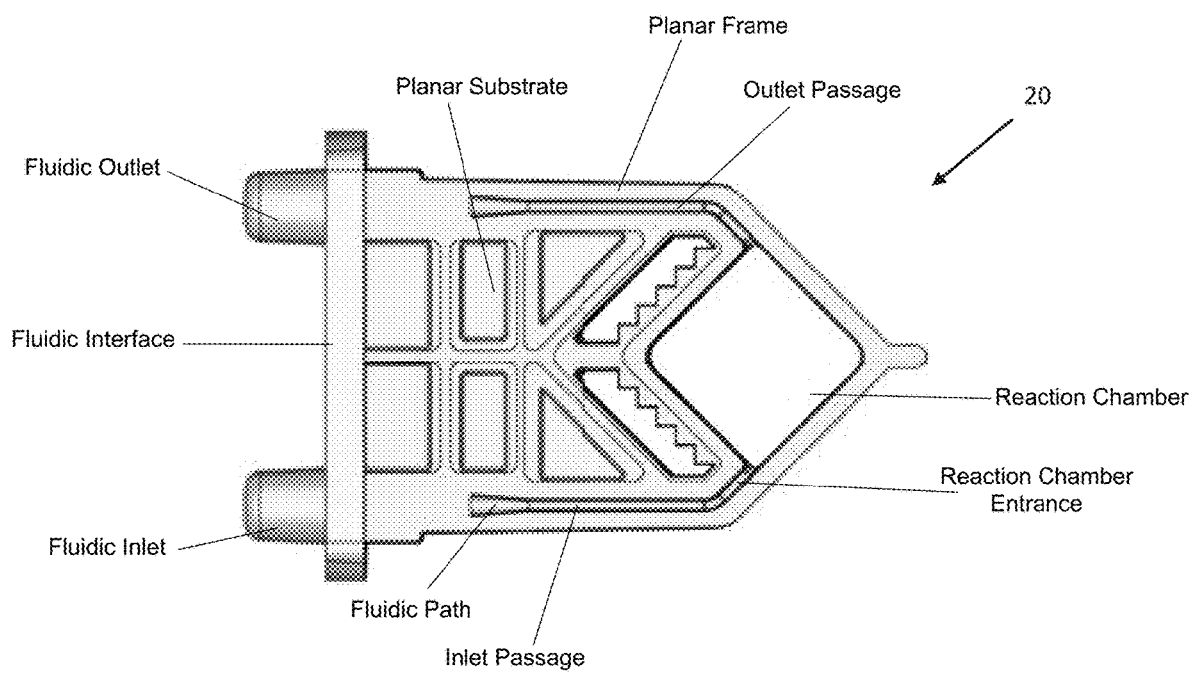

In some embodiments, the thermal control device may be configured for use with a reaction-vessel, such as that shown in FIGS. 1C-1D, which illustrate an exemplary sample processing cartridge 110 and associated reaction-vessel 20 to allow sample preparation and analysis within a sample processing device 100 that performs sample preparation as well as analyte detection and analysis. As can be seen in FIG. 1C, the exemplary sample processing cartridge 110 includes various components including a main housing having one or more chambers for sample preparation to which a reaction-vessel 20, as shown in FIG. 1D, is attached. After the sample processing cartridge 110 and the reaction-vessel 20 are assembled (as shown in FIG. 1C), a fluid sample is deposited within a chamber of the cartridge and the cartridge is inserted into a sample analysis device. The system module then performs the processing steps in the cartridge needed to perform sample preparation, and the prepared sample is transferred through one of a pair of transfer ports into a fluid conduit of a reaction-vessel attached to the cartridge housing. The prepared fluid sample is transported into a chamber of the reaction-vessel 20, while an excitation means and an optical detection means are used to optically sense the presence or absence of one or more target nucleic acid analytes of interest (e.g., nucleic acid from a bacteria, a virus, a pathogen, a toxin, a genetic mutation, or other target). It is appreciated that such a reaction-vessel could include various differing chambers, conduits, processing regions and/or micro-wells for use in detecting the target analyte(s). An exemplary use of such a reaction-vessel for analyzing a fluid sample is described in commonly assigned U.S. Pat. No. 6,818,185, entitled "Cartridge for Conducting a Chemical Reaction," filed May 30, 2000, the entire contents of which are incorporate herein by reference for all purposes.

Non-limiting exemplary nucleic acid amplification methods suitable for use with the invention include, polymerase chain reaction (PCR), reverse-transcriptase PCR (RT-PCR), Ligase chain reaction (LCR), transcription mediated amplification (TMA), loop mediated isothermal amplification (LAMP), nicking enzyme amplification reaction (NEAR), strand displacing amplification (SDA), rolling circle amplification (RCA), multiple displacement amplification (MDA), helicase dependent amplification (HDA) and Nucleic Acid Sequence Based Amplification (NASBA). Various other application, such as isothermal methods, may utilize the systems and methods herein to provide precise temperature control without requiring thermal cycling. Additional nucleic acid tests suitable for use with the instant invention are well known to persons of skill in the art. Analysis of a fluid sample generally involves a series of steps, which can include optical or chemical detection according to a particular protocol. In some embodiments, a second sample processing device can be used to perform any of the aspects relating to analysis and detection of a target described in U.S. Pat. No. 6,818,185, cited previously and incorporated herein by reference in its entirety.

B. Thermal Control Device

In one aspect, the invention pertains to a thermal control device adapted to provide improved control of temperature while also providing quick and efficient cycling between at least two different temperature zones. As shown in FIG. 1B, the thermal control device 10 is configured to interface with a reaction-vessel 20 to control thermal cycling of the fluid sample contained therein. Such a thermal control device can include at least one active element that generates a heat flux into the reaction-vessel to faciltiate heating for temperature control, such as thermal cycling. In some embodiments, the thermal control device includes more than one active element, such as two active elements (e.g. TEC) bilaterally applied to opposing sides of the reaction-vessel. While examples herein describe thermal cycling, it is appreciated that devices and methods could be used for improved temperature control without thermal cycling, for example, in various applications there require precise temperarture control without cycling (e.g. isothermal amplification methods requiring a controlled temperature to denature or to active an enzyme). The active element(s) can be any suitable heating and/or cooling element. In some embodiments described herein, each of the active element(s) is a TEC that is controlled according to a control algorithm that utilizes an estimated temperature distribution of the reaction-vessel and a temperature command or function. In some embodiments, the temperature command or function is a temperature distribution command trajectory (e.g. desired temperature profile). The thermal control device can further include use of one or more temperature sensors (e.g. thermocouples or thermistors) to detect a temperature of a portion of the TEC and/or an ambient environment in which the reaction-vessel is disposed. A temperature output from one or more sensors are inputs into the control algorithm. In some embodiments, the thermal control device is adapted for one-sided heating of a reaction-vessel by an active element on only one side of the reaction-vessel, while in other embodiments, the device is adapted for two-sided heating (e.g. opposing major faces), for example by an active element on one side and another active element disposed on the opposing face of the reaction-vessel. It is appreciated that any of the features described herein may be applicable to either approach and is not limited to the particular embodiment in which the feature is described.

In some embodiments, each of the active element(s) is a thermoelectric cooler (TEC) having an active heating and cooling element. Thermoelectric cooling uses the Peltier effect to create a heat flux at the junction of two different types of materials. A Peltier cooler, heater, or thermoelectric heat pump is a solid-state active heat pump which transfers heat from one side of the device to the other, with consumption of electrical energy, depending on the direction of the current. Such an instrument is commonly called a Peltier device, Peltier heat pump, solid state refrigerator, or TEC. Such devices are advantageous as they can be used for both heating or cooling. It can also be used as a temperature controller that either heats or cools.

In some embodiments, the thermal control device includes a controller operatively coupled to the one or more TECs for operation in coordination with the estimated temperature distribution and measured temperatures. The control unit can further operate the TECs in coordination with each other in various modes so as to further enhance the resulting temperature distribution during thermal cycling. The control methods receive a temperature input from one or more temperature sensors. In these embodiments, the temperature sensors are configured for measuring a temperature of a portion of a respective TEC and/or an ambient temperature around the reaction-vessel. Accordingly, the temperature sensors can be located in any suitable locations. In some embodiments, the one or more sensors include a first sensor that is thermally coupled with an active face of a respective TEC (e.g. coupled to or embedded within the active face), typically on a "porch" on the backside of an active face as depicted herein, for measuring the TEC temperature. In some embodiments, the one or more sensors further include a second temperature sensor that is configured to measure an ambient temperature. As depicted, the second sensor can be located in an air flow of the heat sink of a TEC, thereby measuring the ambient temperature indirectly. Alternatively, the second sensor can be located in any suitable location. Examples of such devices are described further below in FIGS. 2-3.

II. Thermal Control Device Design and Control Methods

This section describes differing configurations and approaches of controlling thermal cycling in accordance with some embodiments of the invention. These approaches are described within the context of the embodiments noted above utilizing one or more TECs disposed on one or both sides of a reaction-vessel configured for use in a sample analysis instrument of reduced size for carrying out PCR analysis on a fluid sample.

A. Basic Design

In some embodiments, a thermal control device module of the invention utilizes a thermoelectric cooler (TEC), also known as a Peltier cooler. A TEC is a solid-state electronic device consisting of two ceramic plates sandwiching alternating stacks of p- and n-doped semiconductor pillars arranged in a checkerboard-like pattern, wired in series and thermally connected in parallel. When a voltage is applied to the ends of the semiconductors, current flow through the device leads to a temperature differences between the two ceramic plates. For forward voltage bias, the top plate will become cooler than the bottom plate (convention considers the face opposite the one with electrical leads the "cold" face) and is used as a solid-state refrigerator. Reversing voltage causes the "cold" face to now become significantly hotter than the bottom face. Thus, TEC devices have long been a popular choice for thermo-cycling applications. TEC heating/cooling efficiency increases dramatically for smaller, low power devices.

Material advances have enabled production of extremely thin (~3 mm) TECs with significantly increased cooling/heating efficiency and an active area comparable of approximately 10×10 mm suitable for use with a reaction vessel as used with the GeneXpert system. Small commercially available TECs typically have efficiency ~60%; reduced waste heat and small size diminish thermal stress damage, the primary failure mode with repeated cycling necessary for PCR. Small TECs are attractive for a nucleic acid assay test system of reduced size because they are a small, inexpensive, integrated heating/cooling solution, and will produce efficient cooling performance over a large ambient temperature range, unlike forced-air cooling whose efficiency suffers with higher ambient temperature.

Efficient TEC heating/cooling depends on three factors. First, care must be taken to limit the thermal load placed on the TEC device. Due to the reaction-vessel's small size and typical small reaction volume (<100 µl), thermal load is not a significant concern, although devices should be properly loaded with a buffer-filled reaction-vessel for testing. Second, hot and cold heat exchanger performance should be sufficient to dissipate waste heat (about 40% of input system electrical power) with repeated cycling. Failure to manage waste heat can markedly decrease thermal efficiency and, in the worst case, induce system thermal runaway within the entire TEC assembly. In practice, thermal runaway can occur in minutes, where temperatures for the hot and cold faces both become hot enough to de-solder the electrical connections within the device. Because of space constraints within a reduced size analysis system, heat-sink size is limited. Accordingly, often, an aluminum or copper heat-sink (chosen because of high thermal conductivity and heat capacity) with maximized surface area (fins) is integrated along with a small fan to further disperse hot air away from the heat-sink's metal/air interface. Such a unit is sized to be space-appropriate for a portable reduced size nucleic acid analysis system.

For a well-behaved TEC system, there are physical limitations to the difference in temperature (dT) achievable between the hot and cold faces of the Peltier device; peak dT ~70° C. for the most efficient TECs commercially available. This dT is sufficient for PCR, since required thermo-cycling temperatures typically range between 45-95° C. Therefore, most Peltier-based PCR systems have a heat-sink at slightly above ambient temperature (~30° C.) and cycle the opposite face from that base temperature. However, thermal efficiency begins to lag as maximum dT is reached. To maintain heating/cooling speed, maximize system efficiency, and minimize system stress, a thermal management has been developed using multiple TEC devices in accordance with embodiments of the invention, such as in the example embodiment shown in FIGS. 2-3.

Figure 2:
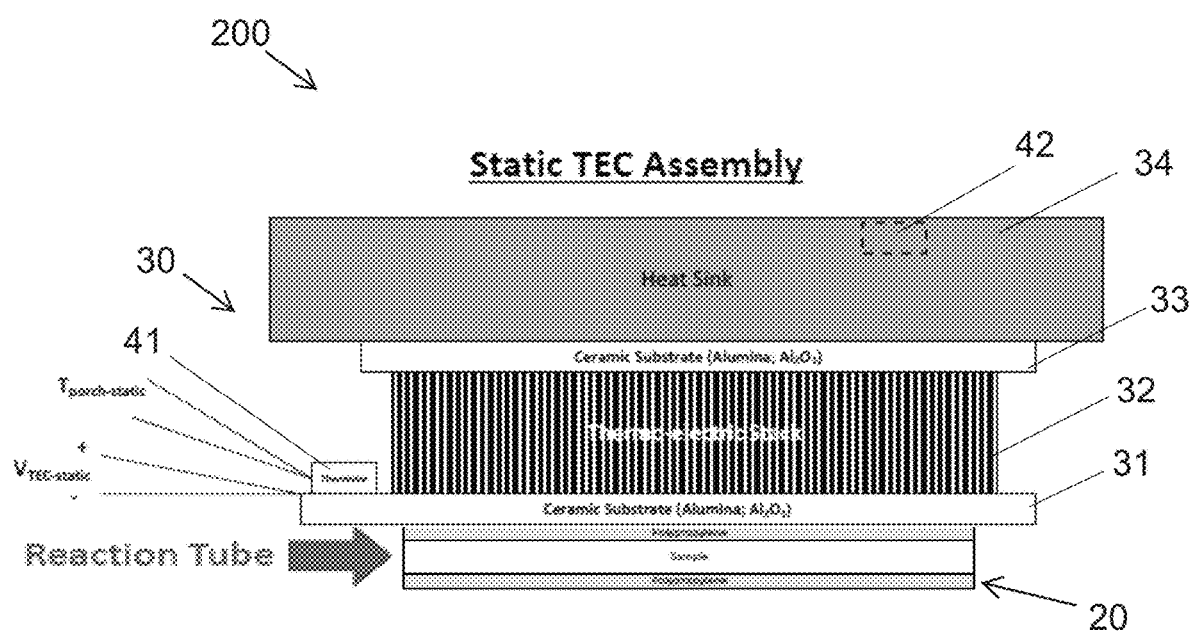
FIG. 2 depicts a thermal control system utilizing a static TEC assembly, in accordance with some embodiments.

FIG. 2 shows an exemplary thermal control device 200 configured as a static TEC assembly, which includes a single TEC device 30 having a thermoelectric stack 32 sandwiched between active and reference faces 31, 33, and a heat sink 34, as described previously. The heat sink can include a fan to draw ambient air therethrough for cooling of the reference face. A thermistor 41 is included in the TEC 30 at or near the active face 31 to allow measurement of a temperature of the TEC, as depicted here thermistor 41 is coupled to the "porch" of the active face. The temperature output of this thermistor is used in the control algorithms described herein. The output of the thermistor 41 can be termed $T_{porch\text{-}static}$, and the voltage drawn by operation of the TEC can be termed $V_{TEC\text{-}static}$ as referred to in the descriptions of the control algorithms described further below. In some embodiments, a second thermistor 42 can be included to measure an ambient temperature around the reaction-vessel. In this embodiment, the thermistor 42 is included in an airflow of the heat sink which draws ambient air from the environment through the heat sink, thereby measuring ambient temperature albeit indirectly. It is appreciated that the second thermistor could be mounted in any suitable location for measurement of the ambient atmosphere and need not be coupled directly to the TEC or associated component.

Figure 3:
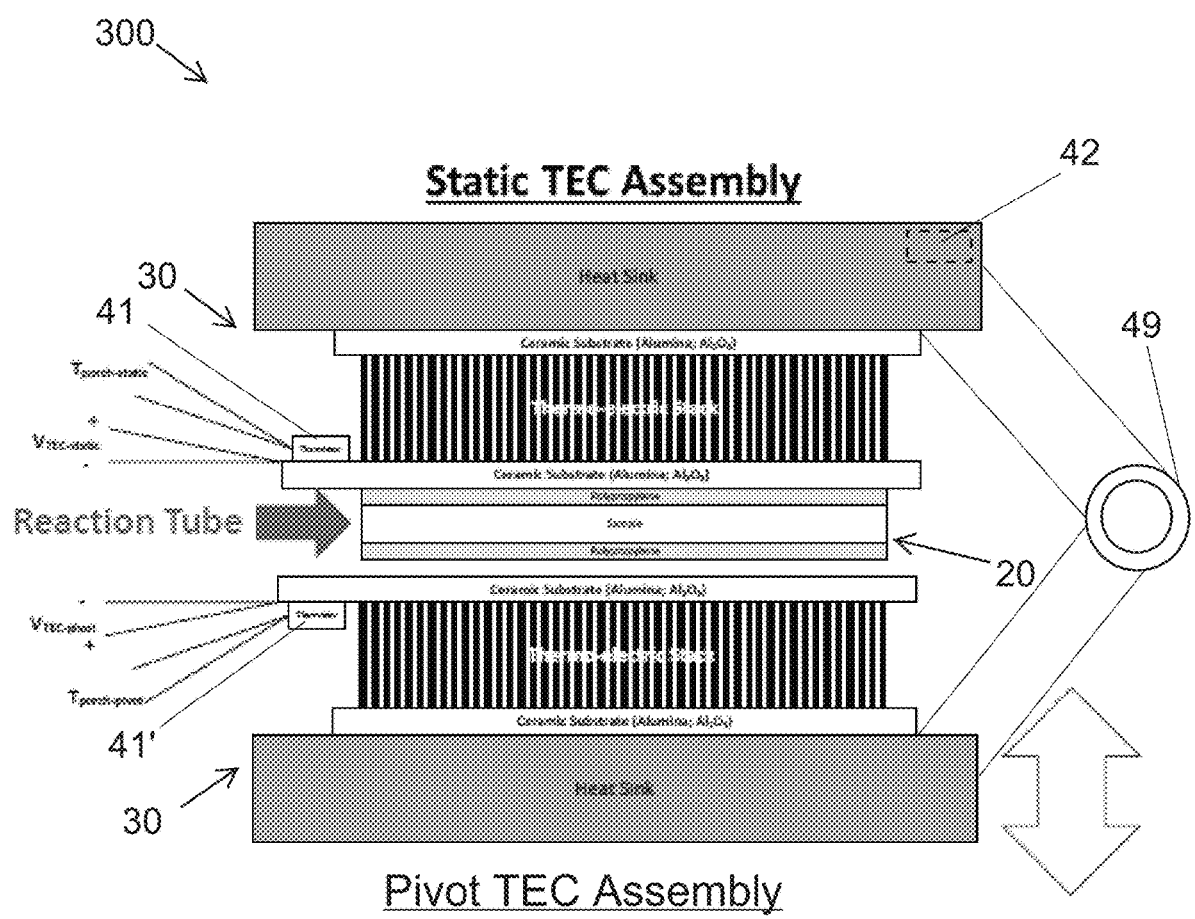
FIG. 3 depicts a dual TEC thermal control system utilizing a static TEC assembly and a pivot TEC assembly, in accordance with some embodiments.

FIG. 3 shows a thermal control device having two active elements configured as a dual TEC embodiment having both a static TEC assembly (such as that described in FIG. 2) on one side of the reaction-vessel and further including a pivot TEC assembly on the opposite side of the reaction-vessel—so called because it engages the reaction-vessel on a pivot 49 (e.g. hinge or hinge-like flexure). While a pivot or hinge is described, it is appreciated that the second TEC assembly could be movable to engage the opposite side of the reaction-vessel in any number of ways. The pivot TEC assembly can be of a similar or identical design as the static TEC assembly with a thermistor 41' at or near the active face 31 (e.g. on the porch). The temperature output of the thermistor 41' can be termed $T_{porch-pivot}$, and the voltage drawn by operation of this TEC can be termed $V_{TEC-pivot}$ as referred to in the descriptions of the control algorithms below. In some embodiments, the pivot TEC assembly can include a second thermistor for ambient measurement (similar to thermistor 42), or the entire assembly 300 can rely on the thermistor 42 of the static TEC assembly for ambient measurement.

As can be seen in FIGS. 2-3, the TECs are configured so that the active face is similar or larger in size than the area of the reaction-vessel containing the sample to be thermally cycled. In some embodiments, the TECs measure 13 (w)×13 (l)×2.2 (t) mm, so that the planar area of the active faces corresponds to the planar area of the GeneXpert system reaction-vessel developed for use with commercially available GeneXpert systems by Cepheid. Typically, the active area is about the same size or larger than the planar area of the reaction-vessel, or at least the area in which the sample to be thermally cycled resides. In some embodiments, the planar area can be smaller than, the same size as, or larger than the planar area of the reaction-vessel. This accommodates reaction-vessels having a fluid volume ranging from about 25 μl (pictured) to about 100 μl. In some embodiments the reaction-vessel has a single well with a volume of about 20, 30, 40, 50, 60, 65, 70, 75, 80, 85, 90, 95, or 100 microliters. In some embodiments, the reaction-vessel contains multiple wells, as shown in FIG. 1D, with the volume of each well being approximately 1 nanoliter or less. However, it is appreciated that thermal control device can be configured to accommodate a reaction-vessel of various differing volumes, smaller or larger than the range noted above. In some embodiments, the TEC assemblies can utilize commercially available TECs or components, such as OptoTEC™ Series HOT20-65-F2A-1312 by Laird. In some embodiments, a small thermistor with +/−0.1° C. temperature tolerance is bonded to the porch area of the active face of the respective TECs. This allows the thermistor to directly measure the temperature of the active face, without occupying space within the chamber in which the reaction-vessel is inserted. The heat-sink can be of any suitable design. In some embodiments, the heat-sink is machined to an overall thickness=6.5 mm, keeping the entire package less than about 13 mm thick, and a planar size=40.0(l)×12.5(w) mm, necessitated by space constraints within an instrument of reduced size. It is appreciated that various other sizes and dimensions could be realized. In some embodiments, the heat sink includes a mini-fan (e.g. a 12×12 mm Sunon Mighty Mini Fan). Note the mini-fan does not need to directly cool the heat-sink; a quiet, durable, cheap, low-voltage (3.3V max) brushless motor is sufficient to maintain heat-sink performance by removing hot surface air from the aluminum/air interface using shear flow, as opposed to direct air cooling (as in some conventional analysis devices, such as the GeneXpert systems or other such devices).

B. Modes of Operation

The thermal control device can be configured to operate according to various modes of operation, switching between differing modes during thermal cycling, or superimposing aspects of modes in order to obtain a desired temperature distribution of the reaction-vessel. While certain modes are described herein, it is appreciated that the concepts described herein are not limited to these particular modes and could include variations of these modes or alternative modes as desired.

Figure 4:
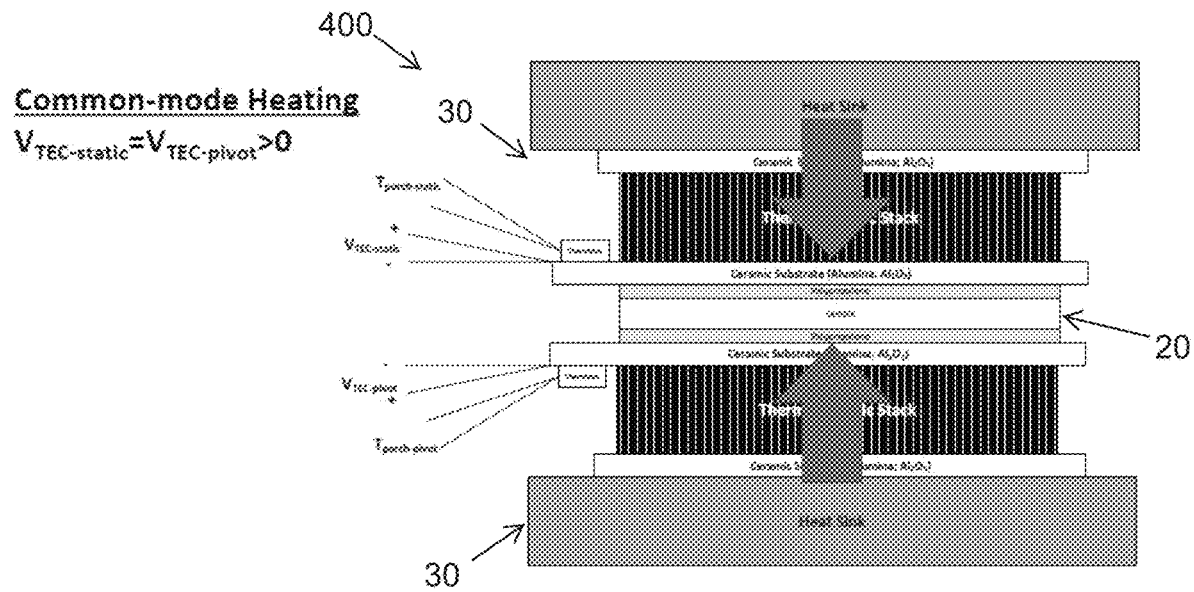
FIG. 4 illustrates a dual TEC thermal control system operating in common-mode heating, in accordance with some embodiments.

FIG. 4 shows a common-mode heating approach 400 utilizing a dual TEC assembly as in FIG. 3. Both the TEC devices operate to direct heat flux into the reaction-vessel to effect heating of the reaction-vessel. As compared to the previous embodiment, where the opposite face of the reaction-vessel was left exposed, this approach provides more uniform, consistent heating and temperature within the reaction-vessel regardless of ambient temperature. In this embodiment, the TEC devices are operating in a like or common manner.

Figure 5:
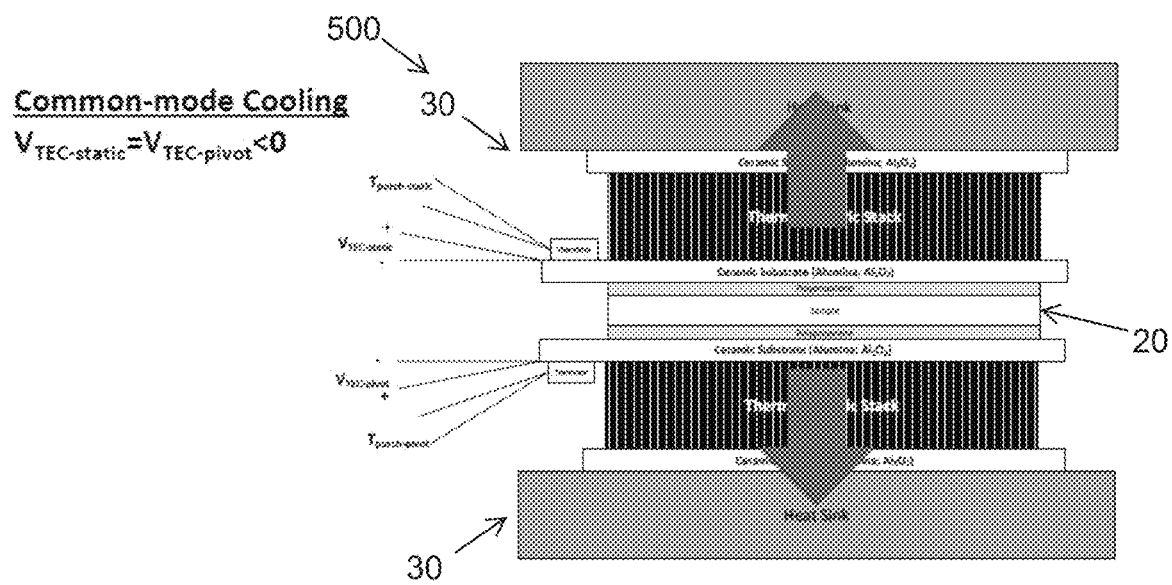
FIG. 5 illustrates a dual TEC thermal control system operating in a common-mode cooling, in accordance with some embodiments.

FIG. 5 shows a common-mode cooling approach 500 utilizing the dual TEC assembly in FIG. 3. Both the TEC devices operate to cool the active face and direct heat flux away from the reaction-vessel to effect cooling of the sample within the reaction-vessel. As compared to the previous embodiment in FIG. 2, where the opposite face of the reaction-vessel was left exposed, this approach provides more uniform, consistent cooling and temperature within the reaction-vessel regardless of ambient temperature. Again, the TEC devices are operating in a like or common manner of operation.

Figure 6:
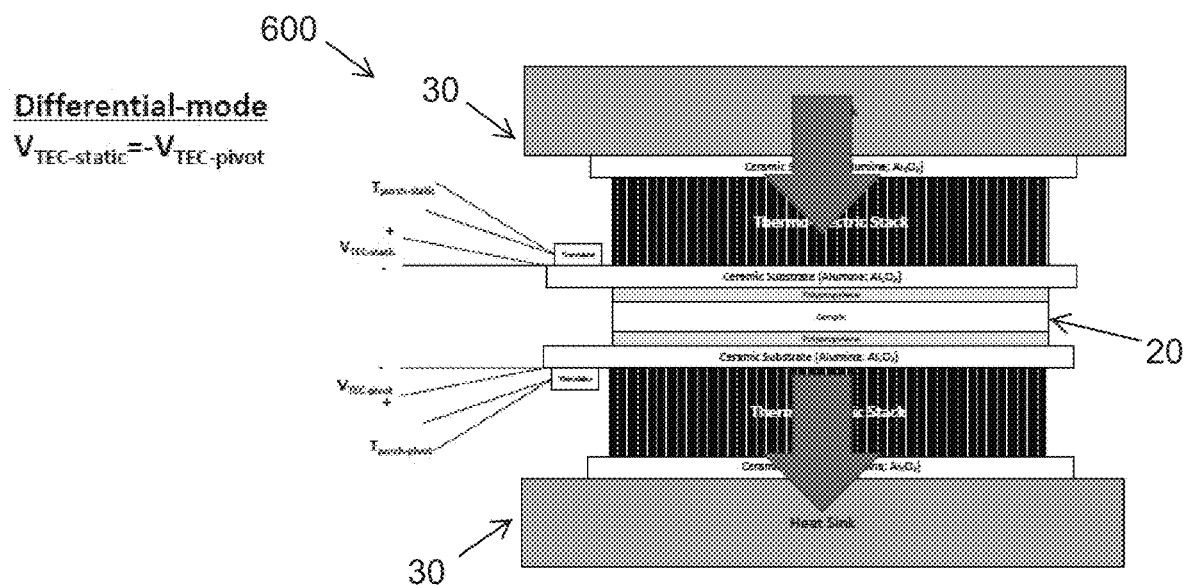
FIG. 6 illustrates a dual TEC thermal control system operating in a differential-mode, in accordance with some embodiments.

FIG. 6 shows a differential-mode cooling approach 600 utilizing the dual TEC assembly in FIG. 3. In this mode, each of the TEC devices operate in different modes of operation, for example, a first TEC device heats the active face, while the second TEC cools the active face. It is appreciated that the operation could be reversed, with the first TEC device cooling and the second TEC heating. This approach provides more uniform, consistent reliable temperature distribution across the reaction-vessel regardless of ambient temperature.

Figure 7:
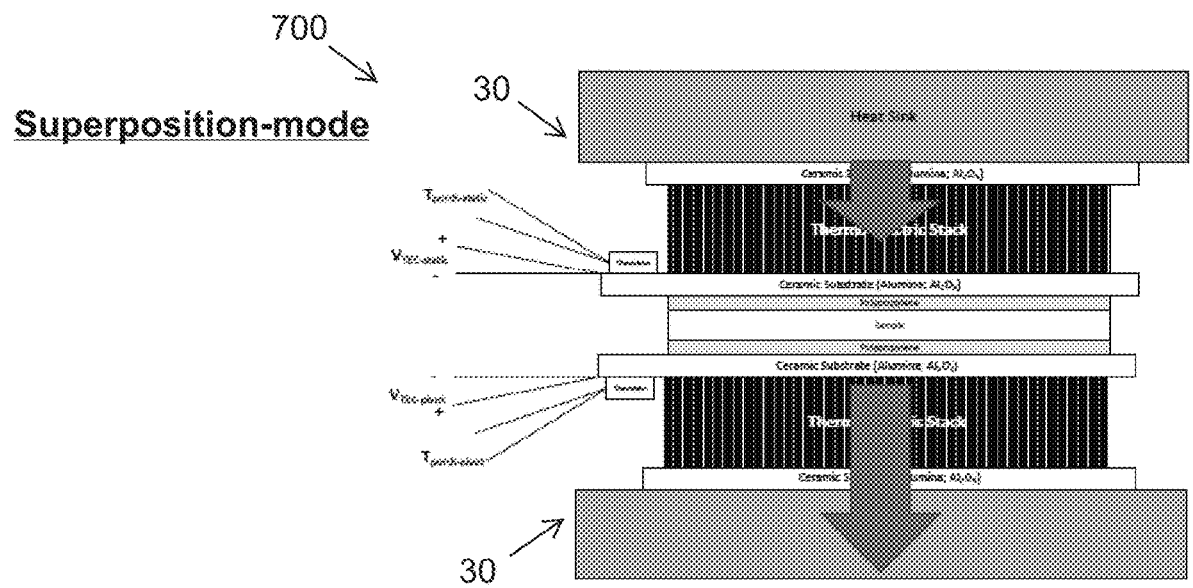
FIG. 7 illustrates a dual TEC thermal control system operating in a superposition mode that superimposes aspects of both common-mode and differential-modes, in accordance with some embodiments.

FIG. 7 shows a superposition-mode approach 700 utilizing the dual TEC assembly in FIG. 3. In this mode, aspects of the common-mode and differential-mode can be combined or superimposed on each other. For example, the operation of the TEC devices can differ but still be of the same type (e.g. cooling or heating). As shown, the first TEC is shown heating but closer to an equilibrium state, while the second TEC is shown as cooling. In other embodiments, the operation of one or both TECs can be varied, including variation of one TEC independent of the other. In still other embodiments, one or both TECs can switch between differing modes of operation (heating or cooling) either in conjunction with each other, in coordination with each other or independently from each other.

C. Parameterization and Operation

Figure 8A:
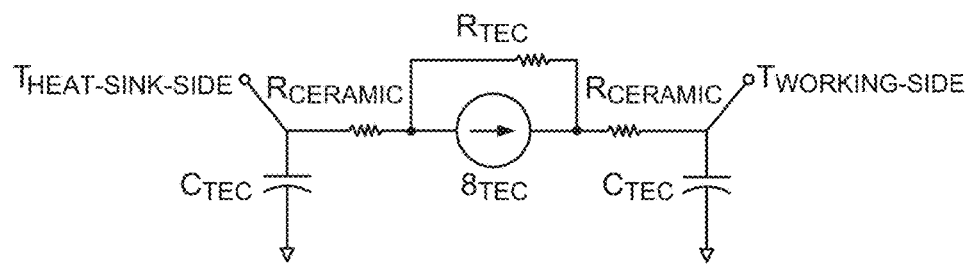
FIGS. 8A-8B show circuit diagrams depicting parameterization of a thermal control system, in accordance with some embodiments.
Figure 8B:
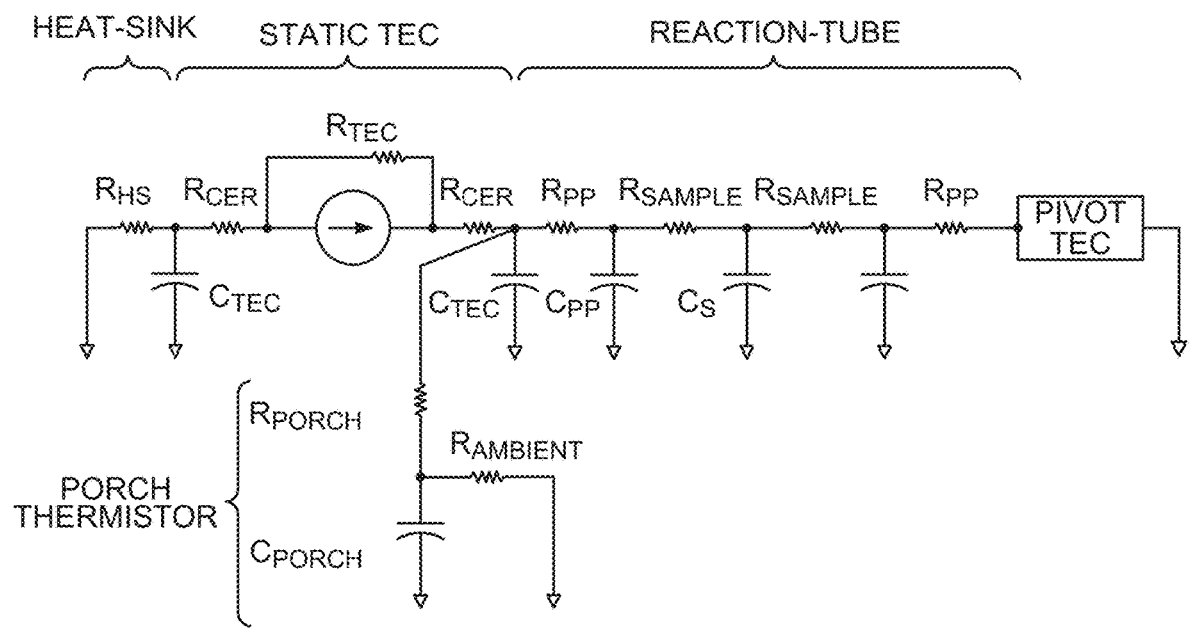

FIGS. 8A-8B show circuit diagrams of how the dual TECs of the embodiment in FIG. 3 can be parameterized for operation in accordance with embodiments of the invention. In the example of FIG. 8A, the following variables have been been applied:

$$R_{TEC} \approx 10° \text{ C./WATT}$$

$$q_{TEC} = K_{TEC} I_{TEC}; K_{TEC} = 6\text{W/AMP}$$

$$2_{TEC} = V_{TEC}/r_{TEC}; r_{TEC} \approx 2\Omega$$

$$V_{TEC} = V_o PWM; V_o = 5V; PWM = 0\text{-}100\%$$

In this example, the dual TEC assembly is operated to control the temperature of the reaction-vessel by operating according to an algorithm that includes determining an estimated temperature model of the temperature distribution across the reaction-vessel and operating of the dual TEC devices utilizing the temperature inputs from the respective temperature sensors to achieve a desired temperature distribution. In some embodiments, the algorithm includes utilizing a pole-zero transfer function that minimized the reaction-vessel errors of the temperature model.

In one aspect, the method of operating the dual TEC assembly in this manner can include the following method steps:

Step 1: Identify the Static Model $$T_{reaction-tube} = K1 * T_{CM-Porch} + K2 * T_{ambient} + K_{bias}$$

Step 2: Identify the TEC Feedforward Parameters $$K_{TEC} = 1/R_{TEC};$$

$$C_{tot} = C_{TEC} + C_{polypropylene} + C_{sample}$$

Step 3: Identify the "Pole-Zero" Transfer Function that Minimizes (Least-Squares) the Reaction-Vessel Error $$T_{reaction-tube-dynamic} = PZ(z) * T_{reaction-tube-static}$$

It is appreciated that the above steps are an example of the implementation described herein and that variations on the above are still in keeping with the inventive concepts described herein. Each of the above steps can be further realized by the following additional examples and sub-steps below.

In regard to Step 1, this step can include the following sub-steps: (1) Install the thermal calibrator into the instrument core; (2) In the thermal chamber, excite the instrument core with time-varying ambient and reaction-vessel setpoints; (3) Record the instrument core ambient temperature, porch temperatures and thermal calibrator temperature; and (4) Using regression, determine the best-fit of the static model to the observed reaction-vessel temperature, for example as follows by use of the equation below:

$$K1 \sim = 1.3; K2 \sim = 0.3; K3 \sim = 0$$

$$T_{reaction-tube_N} = \begin{bmatrix} \underline{T}_{porch_N} & \underline{T}_{ambient_N} & \begin{bmatrix} \vdots \\ 1 \end{bmatrix}_W \end{bmatrix} \begin{bmatrix} K_1 \\ K_2 \\ K_3 \end{bmatrix} = A \begin{bmatrix} K_1 \\ K_2 \\ K_3 \end{bmatrix}$$

$$\begin{bmatrix} \hat{K}_1 \\ \hat{K}_2 \\ \hat{K}_3 \end{bmatrix} = (A^T A)^{-1} A_T \underline{T}_{reaction-tube_N}$$

Typically, in this design, the porch temperature is about 18 degrees below the reaction-vessel (i.e. reaction-tube) temperature at ambient conditions.

In regard to Step 2, this step can include the following sub-steps: (1) Step the reaction-vessel setpoint up and down to excite the system; (2) record the $PWM_k$ command necessary to hold the reaction-vessel temperatures; (3) Derive the conductivity $K = (1/RTEC) = (T_{reaction-tube} - T_{ambient})/PWM_{hold}$ via straight-line fit through the recorded points; (4) During the ramp, record the PWM net of the $R_{TEC}$ compensation; (5) Derive the capacitance, $C_{tot} = (PWM - PWM_{Rtec})/(dT_{reaction-tube}/dt)$.

In regard to Step 3, this step can include the following sub-steps: (1) Excite the instrument with time-varying ambient and setpoints; (2) Identify a "first-cut" pole-zero (P-Z) model from first principles by identifying the reaction-vessel and porch transfer functions; and (3) Determine the time-constants for a two-pole, two-zero transfer function that minimize the least-squares fit by trying "all the possibilities" within a window around the "first-cut" P-Z model. An exemplary equation in accordance with these concepts is:

$$\hat{T}_{R-T\,dynamic} = \frac{(\tau_{z1}s+1)(\tau_{z2}s+1)}{(\tau_{p1}s+1)(\tau_{p2}s+1)} \hat{T}_{R-T\,static} \cong$$

$$\frac{(1-\alpha_{p1})(1-\alpha_{p2})}{(1-\alpha_{z1})(1-\alpha_{z2})} \frac{(1-\alpha_{z1}z^{-1})(1-\alpha_{z2}z^{-1})}{(1-\alpha_{p1}z^{-1})(1-\alpha_{p2}z^{-1})} X$$

$$\hat{T}_{R-T\,static}$$

$$\alpha_{p1} = e^{\wedge}\frac{-\Delta t}{\tau_{1p}}; \alpha_{p2} = e^{\wedge}\frac{-\Delta t}{\tau_{2p}}; \alpha_{z1} = e^{\wedge}\frac{-\Delta t}{\tau_{z1}}; \alpha_{z2} = e^{\wedge}\frac{-\Delta t}{\tau_{z2}}$$

$\Delta t$ = sample time $$\underline{\alpha} = \begin{bmatrix} \alpha_{11} & \alpha_{12} \\ \alpha_{21} & \alpha_{22} \end{bmatrix}$$

$$\tilde{H}(z) = \frac{\frac{K_\alpha}{(1-\alpha_n)(1-\alpha_{21})}}{(1-\alpha_{12})(1-\alpha_{22})} \frac{(1-\alpha_{12}z^{-1})(1-\alpha_{22}z^{-1})}{(1-\alpha_{11}z^{-1})(1-\alpha_{21}z^{-1})}$$

$$\hat{T}_{R-T_{dynamic}}(z) = \tilde{H}(z)\hat{T}_{R-T_{static}}$$

$$\hat{T}_{R-T_{dynamic_k}} = (\alpha_{11} + \alpha_{21})\hat{T}_{R-T_{K-1}} - \alpha_{11}\alpha_{21} +$$

$$K_\alpha \left( \hat{T}_{R-T_{static_K}} - (\alpha_{12} + \alpha_{22})\hat{T}_{R-T_{static_{K-1}}} + \alpha_{12}\alpha_{22}\hat{T}_{R-T_{static_{K-2}}} \right)$$

D. Optimized Prediction of Temperature Distribution

Figure 9:
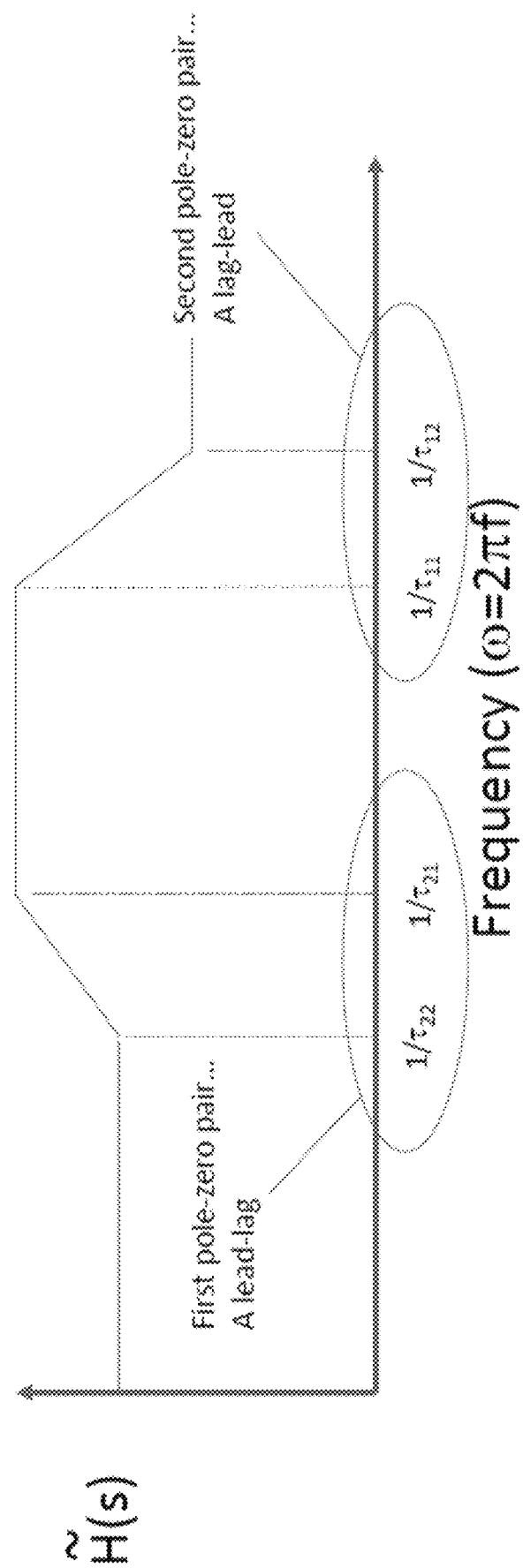
FIG. 9 shows a graphical depiction of identification of the pole-zero transfer function for use in a control algorithm of a thermal control system, in accordance with some embodiments.
Figure 12:
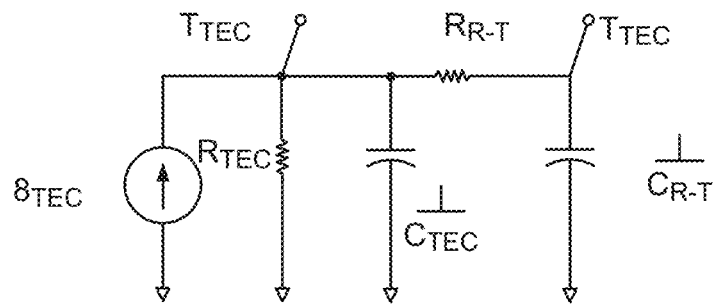
FIG. 12 shows an exemplary circuit diagram, in accordance with some embodiments.

A graphical depiction of the identification of the pole-zero transfer function is shown in FIG. 9. In one aspect, the two-pole, two-zero model described herein provides an optimal prediction of the temperature distribution. An exemplary circuit diagram is shown in FIG. 12. Equations (10), (11) and (12) demonstrate how the temperature distributions are optimized:

$$T_{TEC} = q_{TEC}\left(\frac{R_{TEC}Z_{LOAD}}{R_{TEC} + Z_{LOAD}}\right) \quad \text{Eq. 10}$$

$$T_{TEC} = q_{TEC}\left(\frac{R_{TEC}}{\frac{R_{TEC}}{Z_{LOAD}} + 1}\right) = q_{TEC}\left(\frac{R_{TEC}}{\frac{R_{TEC}C_{TOT}s(R_{R-T}C^*s+1)}{R_{R-T}C_{R-T}s+1} + 1}\right) = \quad \text{Eq. 11}$$

$$q_{TEC}\frac{R_{TEC}(R_{R-T}C_{R-T}s+1)}{R_{TEC}C_{TOT}s(R_{R-T}C^*s+1) + R_{R-T}C_{R-T}s+1}$$

$$T_{R-T} = T_{TEC}\left(\frac{1}{R_{R-T}C_{R-T}s+1}\right) = \quad \text{Eq. 12}$$

-continued $$\left(\frac{R_{TEC}}{R_{TEC}C_{TOT}S(R_{R-T}C^*S+1)+R_{R-T}C_{R-T}s+1}\right)q_{TEC} =$$

$$\left(\frac{R_{TEC}}{\tau_a\tau_b s^2 + (\tau_a+\tau_c)s+1}\right)q_{TEC}$$

where $\tau_a = R_{TEC}C_{TOT}$  $\tau_b = R_{R-T}C^*$  $\tau_c = R_{R-T}C_{R-T}$ Thus, Equation (12) provides a simple, lumped parameter that predicts a second-order response (e.g. a two-pole mode). A similar analysis on the porch temperature dynamics similarly predicts a two-pole mode.

Figure 10:
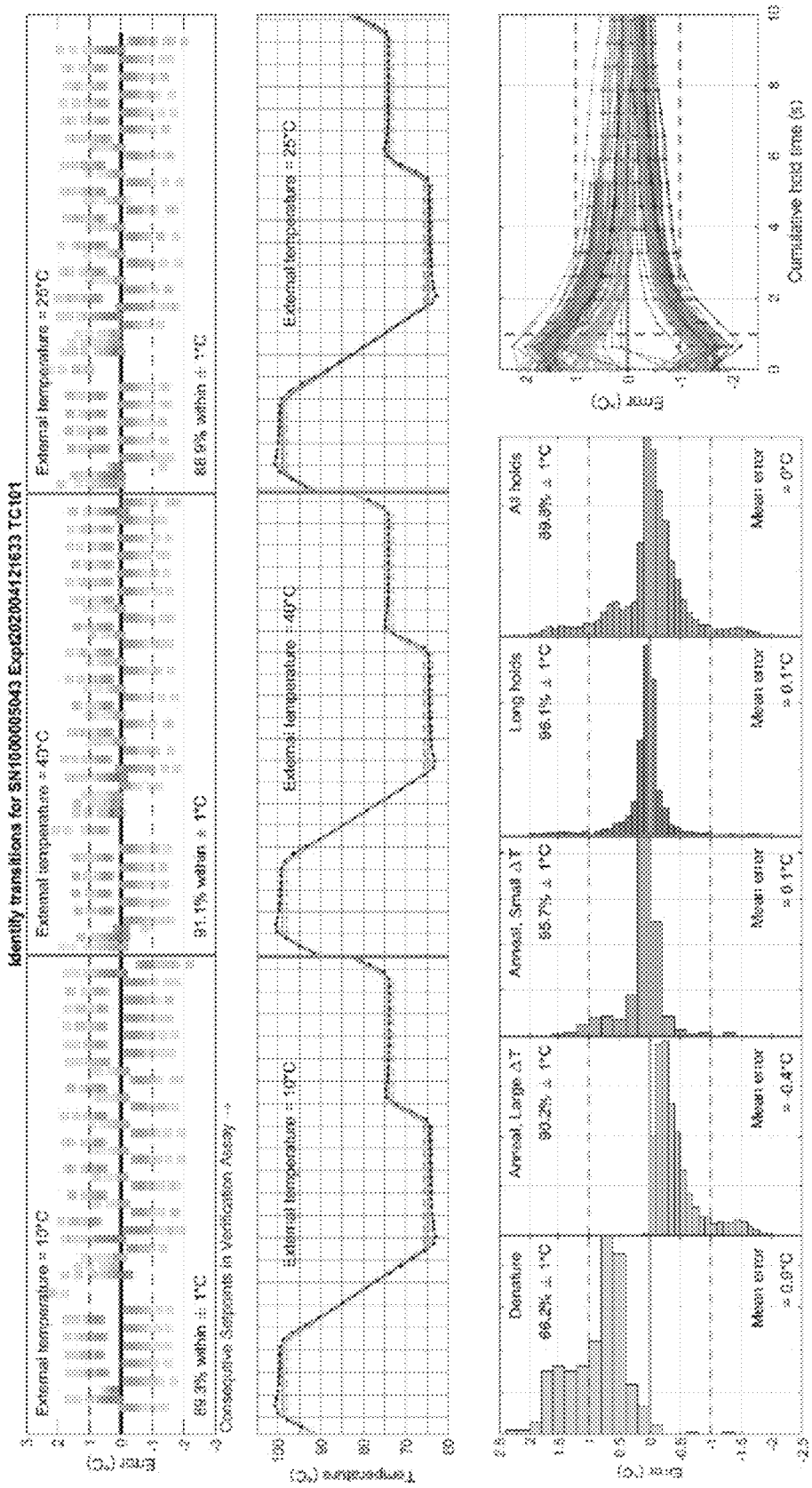
FIG. 10 illustrates temperature characteristics of operation of a thermal control system during thermal cycling before pole-zero optimization.
Figure 11:
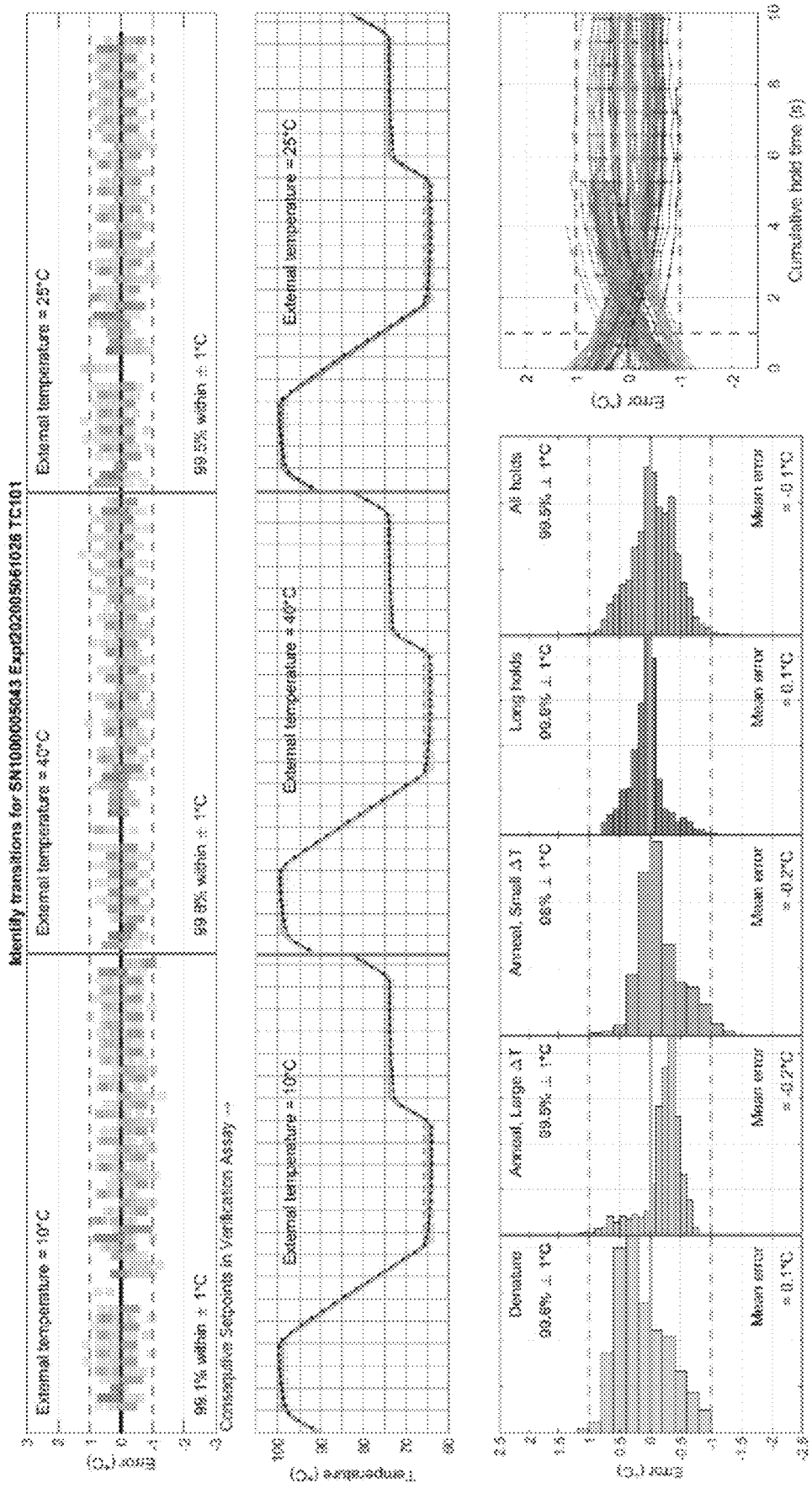
FIG. 11 illustrates temperature characteristics of operation of a thermal control system during thermal cycling after pole-zero optimization.
Figure 13:
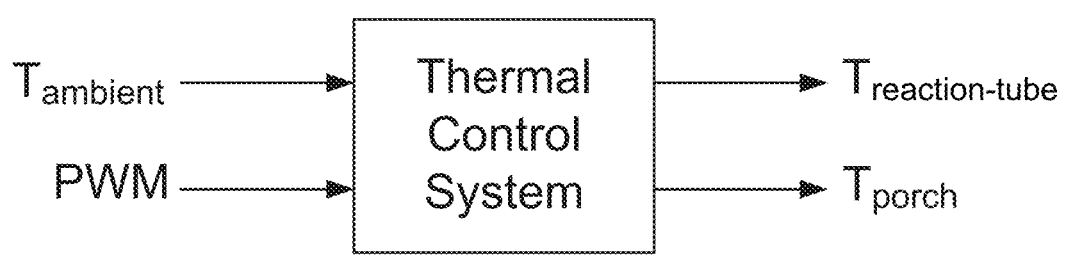
FIG. 13 shows a schematic of the temperature inputs and outputs of the temperature control system, in accordance with some embodiments.

The improved performance in controlling temperature by the control methods described herein are further demonstrated by FIGS. 10-11. FIG. 10 shows temperature characteristics during thermal cycling before application of pole-zero optimization. FIG. 11 shows the temperature characteristics during thermal cycling after application of pole-zero optimization, thereby illustrating the improved accuracy and thermal control. FIG. 13 shows a schematic of the temperature inputs and outputs of the temperature control system, in accordance with the aspects describe above. The following control equations can be utilized:

$$\begin{bmatrix}\hat{T}_{reaction}(s)\\T_{porch}(s)\end{bmatrix} = \begin{bmatrix}G_{11}(s) & G_{12}(s)\\G_{21}(s) & G_{22}(s)\end{bmatrix}\begin{bmatrix}T_{ambient}(s)\\PWM(s)\end{bmatrix} = \underline{C_o}(s)\begin{bmatrix}T_{ambient}(s)\\P_{WM}(s)\end{bmatrix}$$

The PWM can be solved by applying the following equation:

$$PWM(s) = \frac{1}{G_{22}(s)}[T_{porch}(s) - G_{21}(s)T_{ambient}(s)]$$

The PWM can then be utilized in the R-T equation, as follows:

$$\hat{T}_{reaction\,tube}(s) =$$

$$G_{11}(s)T_{ambient}(s) + \ldots \ldots \frac{G_{12}(s)}{G_{22}(s)}(T_{porch}(s) - G_{21}(s)T_{ambient}(s)) =$$

$$\left[G_{11}(s) - \frac{G_{12}(s)G_{21}(s)}{G_{22}(s)}\right]T_{ambient}(s) + \left[\frac{G_{12}(s)}{G_{22}(s)}\right]T_{porch(S)}$$

In the following equation, if the reaction-vessel (R-T) and porch dynamics are assumed to be second order, then the ratio of $G_{12}(s)/G_{22}(s)$ is simply a scale factor (ratio of DC gains on the PWM) times a two-pole, two-zero transfer function. Hence, the poles of the porch become the zeros of this transfer function and the poles of this transfer function are the poles of the R-T. Thus, calibration of the static and dynamic systems can be based upon this approach from a first principles model. This contrasts with an empirical approach common in thermal controls.

$$T_{reaction-tube}(s) = \frac{G_{12}(s)}{G_{22}(s)}\left[T_{porch}(s) + \left(\frac{G_{11}(s)G_{22}(s)}{G_{12}(s)} - G_{21}(s)\right)T_{ambient}(s)\right]$$

In view of the control algorithms and proofs noted above, it is appreciated that the approaches described herein allows the temperature control system to control the temperature of the reaction-vessel with a high degree of accuracy and precision, particularly during thermal cycling between differing temperatures regardless of ambient temperature and without making any direct measurement of the reaction-vessel temperature.

In one aspect, a static calibration can entail utilizing a linear combination of the porch temperature and ambient temperature such that a bias approximates the reaction-vessel temperature distribution.

In another aspect, a dynamic adjustment is used to compensate the time response to account for differences in porch and reaction-vessel dynamics. The dynamic adjustment can be a two-pole, two-zero filter. This allows the dynamic adjustment to be customized to normalize the temporal response across the instrument core. If not normalized, the yield at thermal verification may be low and assay performance could be adversely affected.

In another aspect, the concepts described herein provide for an optimal filter, H(z), that minimizes the reaction-vessel prediction error, thereby providing more accurate estimation of the reaction-vessel temperature distribution and hence, improved control and accuracy during thermal cycling regardless of ambient temperature.

It is appreciated that any of the above equations can be implanted in firmware within a memory of a processor of a control unit of the dual TEC assembly. Further, it is appreciated that the above equations are examples of practical implementations and it is understood that variations of these concepts are within the scope of the inventive concepts as described herein.

Figure 14:
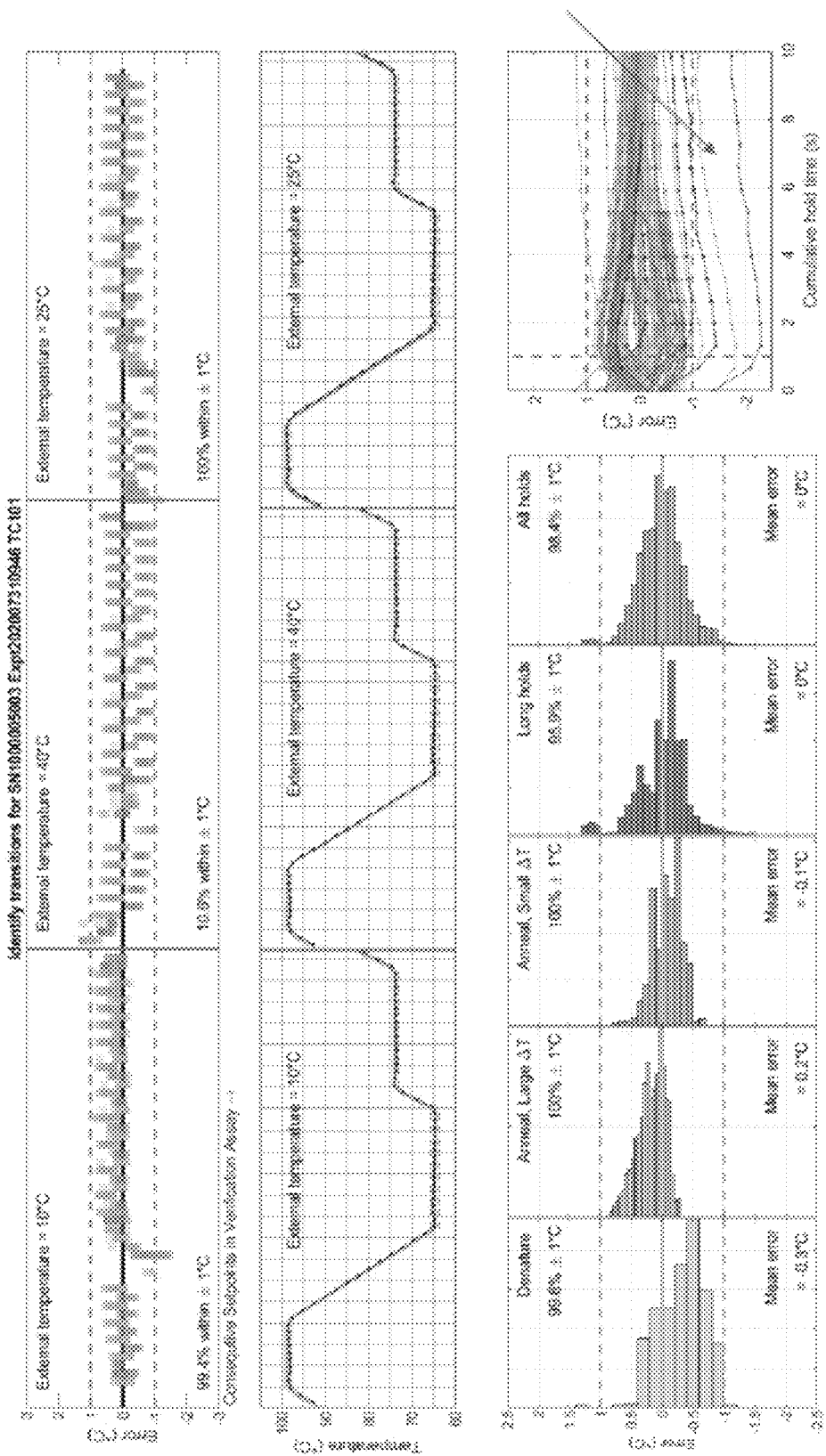
FIG. 14 depicts temperature characteristics and fluctuations that may occur during conventional thermal cycling.
Figure 15:
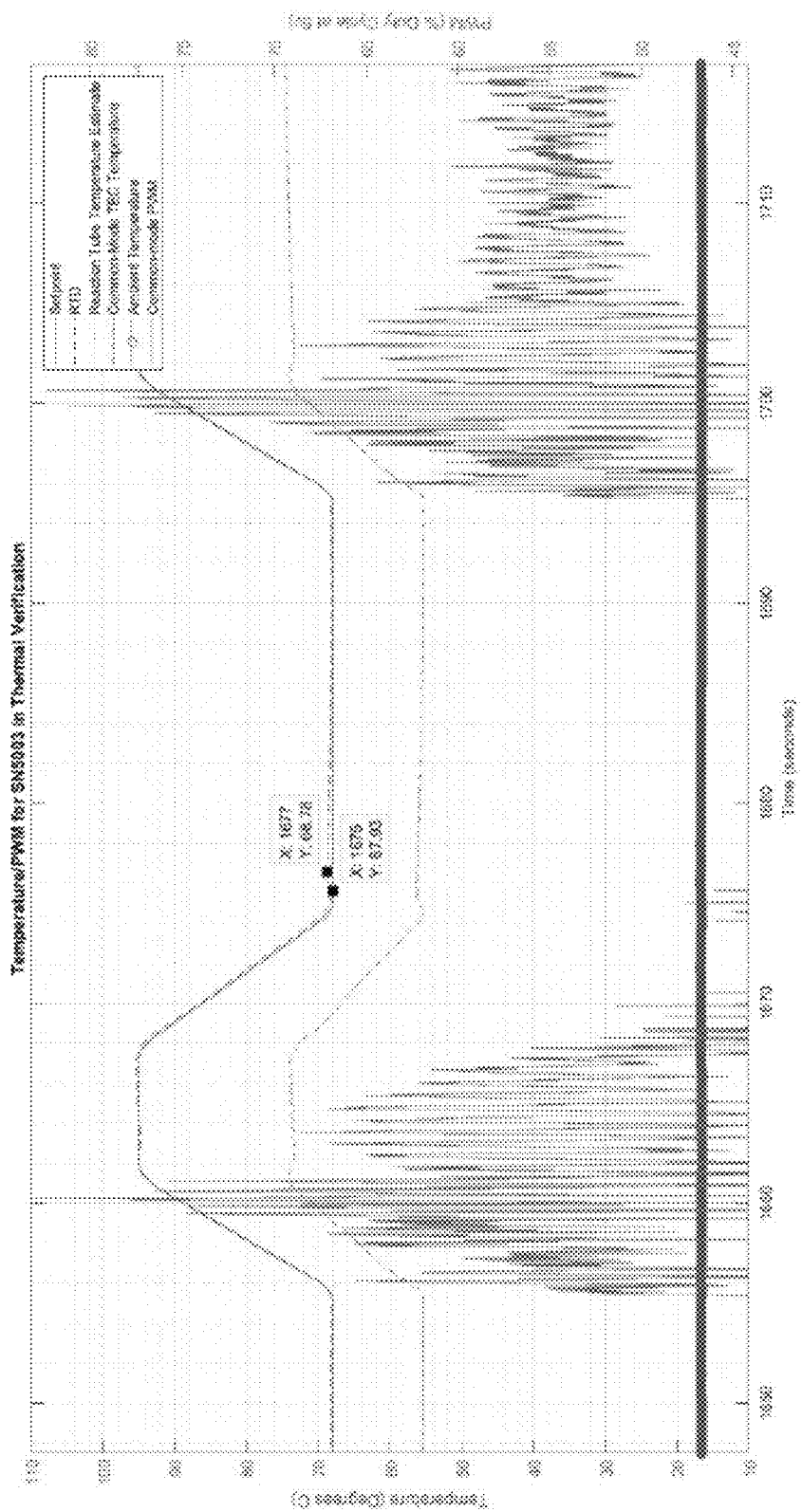
FIGS. 15-16 depicts temperature versus pulse-width-modulation illustrating differences between the RTD and set points, as well as the reaction-vessel temperature estimate versus the common-mode TEC temperature and ambient temperature that may occur during thermal cycling.
Figure 16:
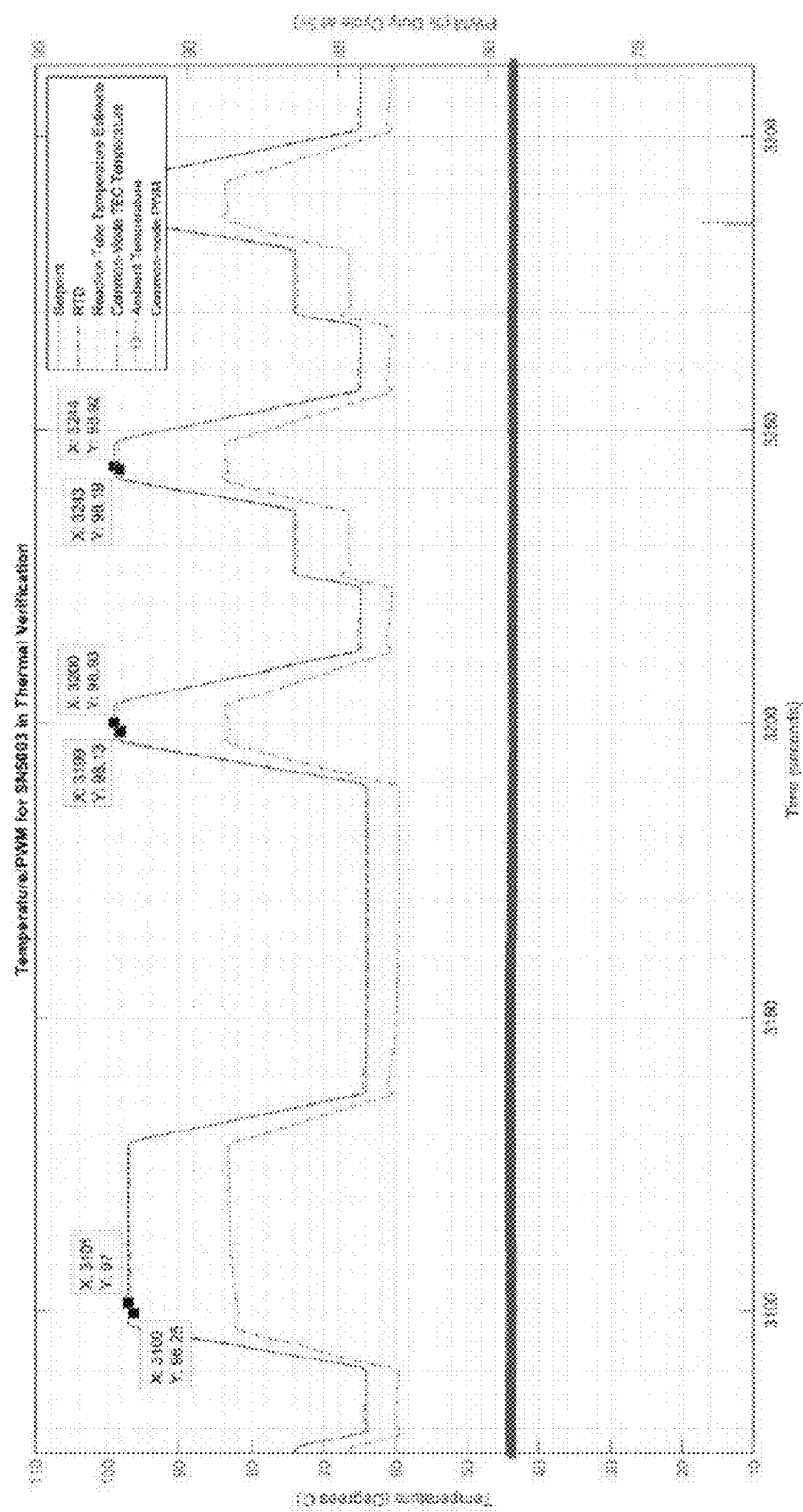

FIG. 14 depicts aspects of temperature characteristics and fluctuations occurring during conventional thermal cycling that are addressed by the improved thermal control device and methods described herein. As can be seen in the graph at lower-right, there may be excessive temperature deviations from the setpoint, which contributes to thermal verification error. FIGS. 15-16 depicts temperature versus PWM illustrating differences between the RTD and set points, as well as the reaction-vessel temperature estimate versus the common-mode TEC temperature and ambient temperature.

In some aspects, the errors in estimating and controlling temperature errors evident from FIGS. 14-16 can be substantially resolved by applying the estimation and control approaches described herein. In some embodiments, a pole-zero approach can be utilized to address and resolve the above-noted errors.

As referred to in various methods described herein, a "transfer function" is an input-output relationship of the dynamic system that is typically represented symbolically. "Continuous time" can be represented by a Laplace transform that symbolizes the solution to a differential equation. "Discrete time" can be a z-transform that symbolizes a differential equation. "Convolution" (filtering) in the time domain can be represented as a multiplication of transfer functions in the frequency domain. A "pole" is a root in the denominator of the transfer function, and the "zero" is a root in the numerator of the transfer function. "System identification" refers to a method that derives the dynamics of a system from observation of the input(s) and output(s). The terminology used herein can be further understood by referring to Lennart Ljung, "*System Identification—Theory for the User*", 1998, the entire contents of which are incorporated herein by reference.

In some embodiments, the methods of estimation and control can include the following steps: 1) Import the serial number, aligned data (e.g. AlignData table) and a static calibration vector; 2) Perform verification (running plotVerificationDataA.m), 3) Determine and run a thermal model (e.g. thermalModelLjungCfinal.m); and 4) Perform pole-zero optimization. It is appreciated any or all of the above steps can be incorporated into firmware on a memory of a processor control unit of the temperature control system.

In regard to step 1) of importing the serial number, aligned data and a static calibration vector, typically, the vector is entered in the last script when final optimization is performed.

In regard to step 2) of performing verification sequence, this step can entail any or all of the following sub-steps: (i.) Review the data including RTD, ambient temperature, temperature command, porch temperature and PWM to ensure a complete dataset is captured. Typically, three full cycles across ambient temperature should be present. (ii) Confirm the presence of a quiescent, steady-state condition at a given time (e.g. at t=500 seconds); (iii) Record the time alignment offset between the RTD and the vT data. In some embodiments, this can be entered during Step 4. and (iv.) Save the plot (e.g. as a .png file) so that it serves as a basis record for the "traveler." Here, the "traveler" is the documentation used in manufacturing to record the tests and test results for an instrument.

In regard to step 3) of running a thermal model, this step can entail any or all of the following steps: (i) Utilizing the poles from the RTD-PWM model as an initial estimate for the poles in the pole-zero optimizer of Step 4; (ii) utilizing the poles from the porch-temperature-PWM model as the initial estimate for the zeros in the pole-zero optimizer in Step 4; and (iii) Using/saving the porch-temperature-PWM model as a "signature" for a comparison with post-shipment modeling while running real assays. Here, the pole-zero model is a frequency domain signature that captures its response for future reference.

In regard to step 4) of performing pole optimization, this step can further include, after running the second pass, recording and reporting α for updating of the NVRAM.

E. Control System Architecture

Figure 17:
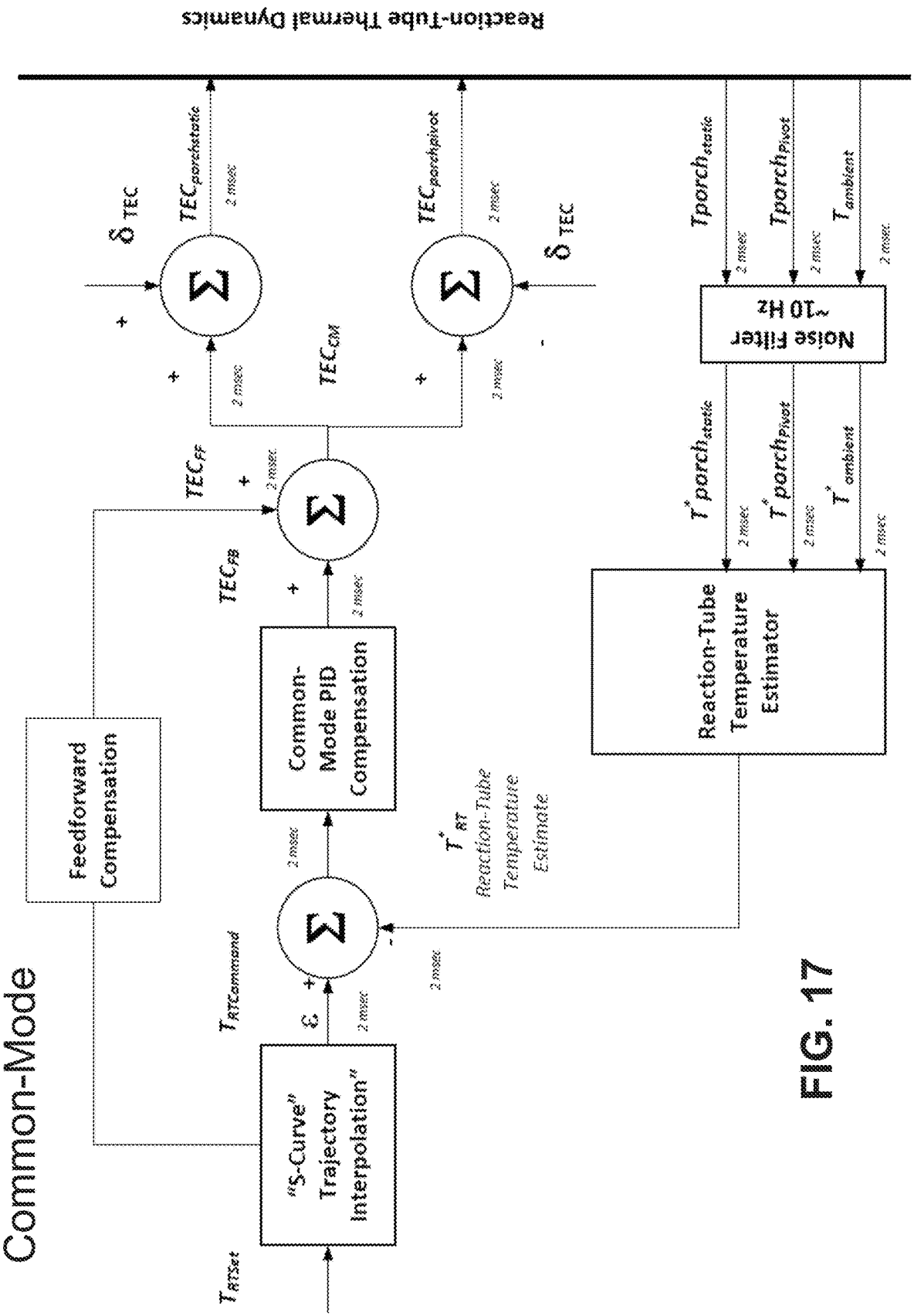
FIG. 17 depicts a schematic of a control system architecture of the common-mode approach described herein, in accordance with some embodiments.
Figure 18:
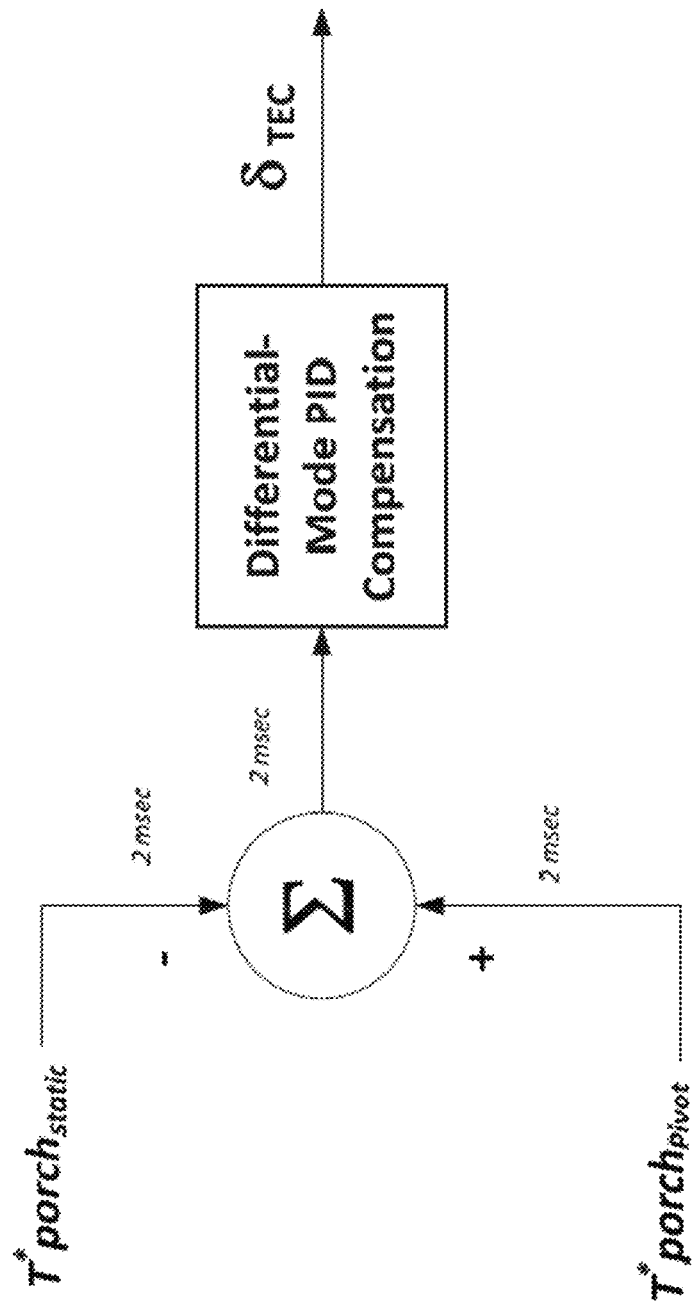
FIG. 18 depicts a schematic of the control system architecture of the differential mode approach described herein, in accordance with some embodiments.
Figure 19:
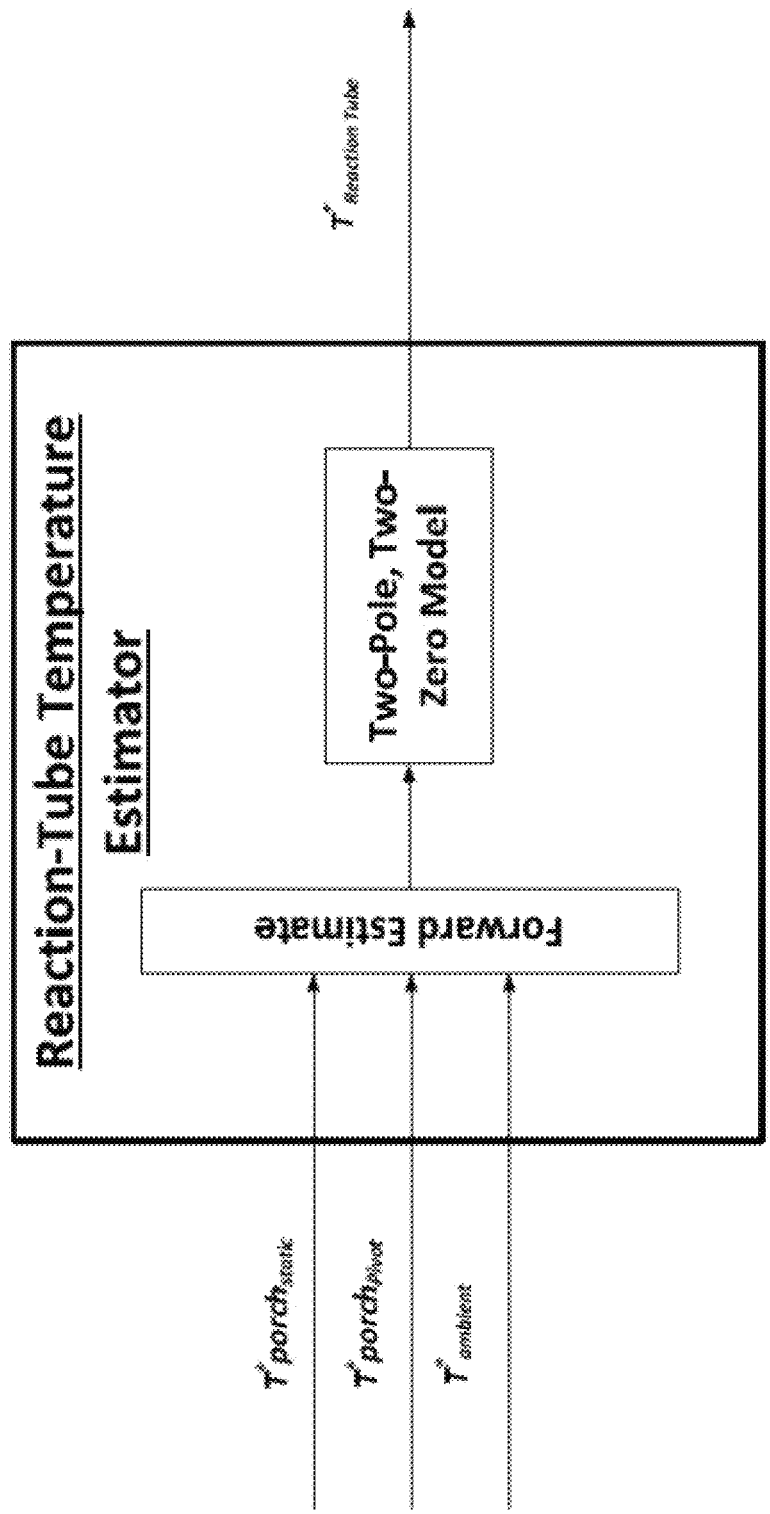
FIG. 19 depicts a schematic of a reaction-vessel temperature estimator that can be utilized in the control approaches described herein, in accordance with some embodiments.

FIG. 17 depicts a schematic of the control system architecture of the common-mode approach described above. FIG. 18 depicts a schematic of the control system architecture of the differential-mode described previously. FIG. 19 depicts a schematic of a reaction-vessel temperature distribution estimator that can be utilized in the control approaches described above.

Figure 20:
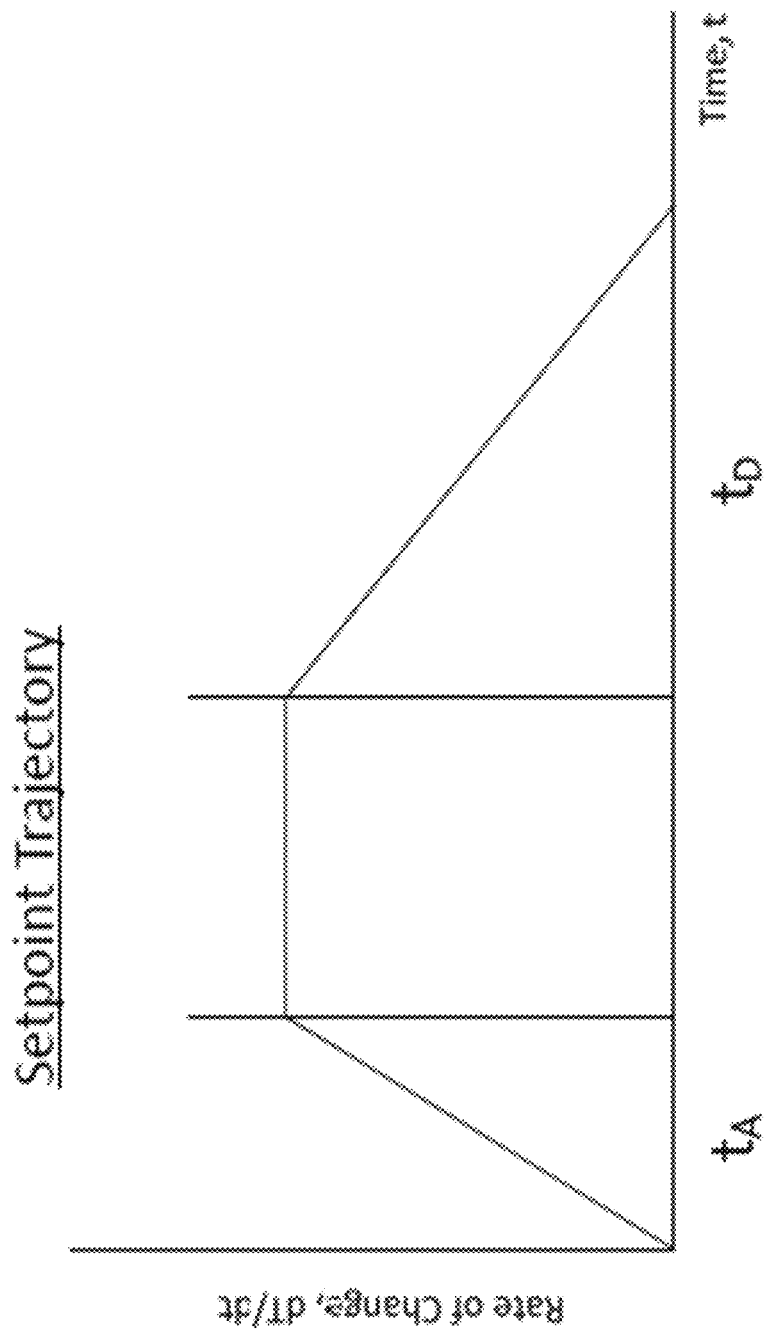
FIG. 20 depicts a graph of a setpoint trajectory designating a desired rate of change over time, in accordance with some embodiments.

FIG. 20 depicts a graph of the setpoint trajectory in regards to the rate of change over time. In this embodiment, the setpoint trajectory uses a trapezoidal velocity profile with programmable "acceleration" (tA) and "deceleration" (tD) time. The tA and tD are functions of the command step size and endpoint. This risk control measure (RCM) minimizes the TEC solder temperature (overshoot) at high denature temperatures.

It is appreciated that the setpoint trajectories depicted above are exemplary and that any desired setpoint trajectory could be realized. A typical PCR assay has about 40 thermal cycles from the anneal temperature (~65° C.) to the DNA denaturation temperature (~95° C.) and back to the anneal temperature. Differing assays may have greatly differing thermal cycling requirements such that the setpoint trajectories may vary considerably between assays.

In the foregoing specification, the invention is described with reference to specific embodiments thereof, but those skilled in the art will recognize that the invention is not limited thereto. Various features, embodiments and aspects of the above-described invention can be used individually or jointly. Further, the invention can be utilized in any number of environments and applications beyond those described herein without departing from the broader spirit and scope of the specification. The specification and drawings are, accordingly, to be regarded as illustrative rather than restrictive. It is recognized that the terms "comprising," "including," and "having," as used herein, are specifically intended to be read as open-ended terms of art.

What is claimed is:

1. A thermal control system for controlling temperature of a reaction-vessel, the reaction-vessel having two opposing faces and containing a sample to be analyzed, wherein the system comprises:
   at least one active element that generates a heat-flux, wherein the at least one active element is positioned to direct the heat-flux into at least one face of the reaction-vessel when placed adjacent thereto;
   an electronics module having power electronics that power the at least one active element;
   one or more temperature sensors that are positioned and configured to measure:
      an ambient temperature indicative of the thermal operating environment around the reaction-vessel; and/or
      the temperature of a portion of the at least one active element;
   a control unit having a processor, the control unit being communicatively coupled with the one or more temperature sensors and operably coupled with the electronics module, wherein the processor is configured to:
      determine an estimated thermal model of a reaction-vessel temperature distribution across the reaction-vessel using at least a state of the power electronics of the electronics module as an input;
      determine or obtain a temperature command or a function representing a desired temperature distribution profile for the reaction-vessel; and
      regulate a reaction-vessel temperature distribution in accordance with the temperature command or the function and the estimated thermal model of the reaction-vessel temperature-distribution so as to achieve a regulated output of the reaction-vessel temperature distribution that is substantially independent of the ambient temperature.

2. The thermal control system of claim 1, wherein the temperature command or the function comprises a temperature distribution trajectory.

3. The thermal control system of claim 1, wherein the state of the power electronics includes at least one of an active element drive voltage, a current, and a temperature-dependent electrical impedance.

4. The thermal control system of claim 1, wherein the control unit comprises a vector of coefficients employed in a state-estimator recorded on a memory of the processor and configured for determining the reaction-vessel temperature distribution.

5. The thermal control system of claim 1, wherein the control unit comprises a control algorithm recorded on a memory of the processor and configured for regulating the reaction-vessel temperature distribution by utilizing a pole-zero filter model.

6. The thermal control system of claim 1, wherein the one or more temperature sensors comprise:
   a first temperature sensor positioned and configured to measure the temperature of a portion of the at least one active element.

7. The thermal control system of claim 6, wherein the one or more sensors further comprise:

a second temperature sensor positioned and configured to measure the ambient temperature indicative of the thermal operating environment around the reaction-vessel.

8. The thermal control system of claim 1, wherein at least one of the at least one active element is a thermo-electric cooler (TEC) comprising an array of Peltier elements sandwiched in between thermally-conductive plates.

9. The thermal control system of claim 8, wherein the at least one active element comprises two active elements configured as two TECs that are positioned to be bilaterally applied to the reaction-vessel when placed within the thermal control system such that each TEC contacts an opposing face of the reaction-vessel.

10. The thermal control system of claim 9, wherein each of the two TECs employs:
a heat sink on a side of the TEC opposite the reaction-vessel; and
wherein the one or more temperature sensors comprises at least a first temperature sensor mounted on each of the thermally-conductive plates of the TECs facing the reaction-vessel.

11. The thermal control system of claim 10, where the one or more temperature sensors include a second temperature sensor applied in an air flow of at least one of the TEC heat sinks.

12. The thermal control system of claim 11, wherein the control unit is configured such that the estimated reaction-vessel temperature distribution comprises at least one of an average sample temperature and a sample temperature gradient or profile across the two faces of the reaction-vessel.

13. The thermal control system of claim 12, where the control unit is configured with a common-mode in which the reaction-vessel temperature is controlled by applying a common feedback control to each of the TECs to regulate the average sample temperature.

14. The thermal control system of claim 13, where the control unit includes a temperature regulator control algorithm that applies feedforward control in accordance with at least one of a rate of change of a temperature distribution trajectory associated with the temperature command and a difference between the temperature distribution command trajectory and the ambient temperature.

15. The thermal control system of claim 13, where the control unit includes a state estimator that employs a common-mode state estimate that comprises:
a static estimation processing block that determines an average sample temperature as a linear function of the ambient temperature and an average of at least two of the TEC temperature sensors; and
a filter comprising at least one of a zero and at least one of a pole applied to the output of the static estimator.

16. The thermal control system of claim 15, where a number of poles of the filter is two and a number of zeroes of the filter is two.

17. The thermal control system of claim 13, wherein the control unit is further configured with a differential-mode having a differential feedback control to regulate the sample temperature gradient.

18. The thermal control system of claim 17, where the control unit is further configured to apply feedforward control in accordance with at least one of a rate of change of a temperature distribution command trajectory and a difference between the temperature distribution command trajectory and the ambient temperature.

19. The thermal control system of claim 17, wherein the control unit employs a differential-mode controller that uses the temperature difference between opposing faces of the reaction-vessel, the estimate on each face determined by at least one temperature sensor and the state of the power electronics of a respective TEC.

20. The thermal control system of claim 17, wherein the control unit is further configured for superposition of the common-mode and differential-mode to achieve a desired temperature distribution.

21. The thermal control system of claim 17, wherein the control unit is further configured to calibrate the temperature control system utilizing calibration data that is stored on a memory of the processor.

22. A method of controlling a temperature distribution within a reaction-vessel having opposing faces by a thermal control device having at least one active element adjacent to one face of the reaction-vessel, the method comprising:
obtaining, with a control unit of the thermal control device, a temperature output from one or more temperature sensors of a temperature control system, the temperature output corresponding to a temperature of a portion of the at least one active element and/or an ambient temperature indicative of the thermal operating environment around the reaction-vessel;
determining an estimated thermal model of a reaction-vessel temperature distribution across the reaction-vessel using at least a state of a power electronics as an input;
determining or obtaining a temperature command or a function representing a desired temperature distribution profile for the reaction-vessel; and
operating the at least one active element so as to regulate a reaction-vessel temperature distribution in accordance with the temperature command or the function and the estimated thermal model of the reaction-vessel temperature distribution so as to achieve a regulated output of the distribution that is substantially independent of the ambient temperature.

* * * * *